US012659183B2

(12) United States Patent
Saleh

(10) Patent No.: US 12,659,183 B2
(45) Date of Patent: Jun. 16, 2026

(54) ARTIFICIAL INTELLIGENCE DRIVEN LEADING AND TEMPLATIZING OF IDEATION SESSION

(71) Applicant: Microsoft Technology Licensing, LLC, Redmond, WA (US)

(72) Inventor: Sarah Ragab Ismail Saleh, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 18/675,677

(22) Filed: May 28, 2024

(65) Prior Publication Data

US 2025/0373458 A1 Dec. 4, 2025

(51) Int. Cl.
*G06F 40/30* (2020.01)
*G06T 13/40* (2011.01)
*H04L 12/18* (2006.01)
*H04N 7/15* (2006.01)

(52) U.S. Cl.
CPC .......... *H04L 12/1822* (2013.01); *G06F 40/30* (2020.01); *G06T 13/40* (2013.01); *H04N 7/157* (2013.01)

(58) Field of Classification Search
CPC ..... H04L 12/1822; G06F 40/30; G06T 13/40; H04N 7/157
See application file for complete search history.

(56) References Cited

U.S. PATENT DOCUMENTS

2017/0310716 A1 * 10/2017 Lopez Venegas ...........................
G06Q 10/1093
2025/0246186 A1 * 7/2025 Geng ..................... G06F 40/35

* cited by examiner

*Primary Examiner* — Soe Hlaing
(74) *Attorney, Agent, or Firm* — NovoTechIP International PLLC

(57) ABSTRACT

A data processing system implements detecting an occurrence of a trigger condition during an online meeting among a plurality of client devices associated with participants of the session, the occurrence of the trigger condition indicating that an ideation session for collecting ideas from the participants should be initiated; selecting an ideation session template based on meeting information associated with the online meeting, each ideation session template comprising a natural language prompt template that includes instructions to a language model to generate an agenda for a specific type of ideation session and to conduct the ideation session according to the agenda; constructing a prompt based on the natural language prompt template of the ideation session template; and providing the prompt as an input to the language model to cause the language model to generate the agenda for the ideation session and conduct the ideation session according to the agenda.

16 Claims, 18 Drawing Sheets

Meeting Chat

Virtual Assistant

Welcome! I am here to help you as Maya assigned me to run this ideation session.

Virtual Assistant

Please feel free to interrupt me if you have a question or comment.

Virtual Assistant

Here is the meeting agenda that we will be following today.

Introduction (5 minutes):
- Welcome and overview of the meeting objectives.
- Explain the use of the timer to keep the meeting on track.

Context Setting (10 minutes):
- Briefly discuss the topic or issue at hand.
- Clarify any questions to ensure that everyone has a shared understanding.

455

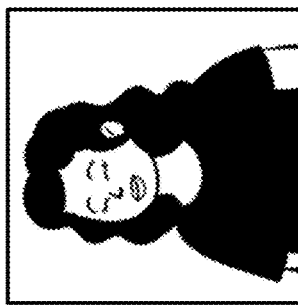

Kara

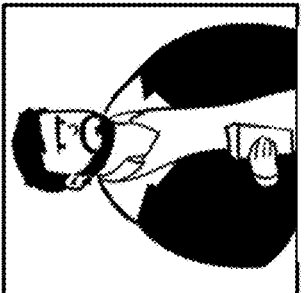

Carlos

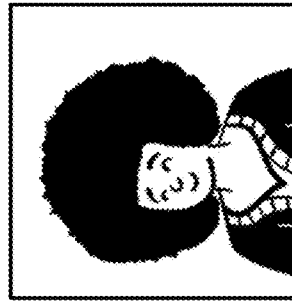

Maya

Virtual Assistant

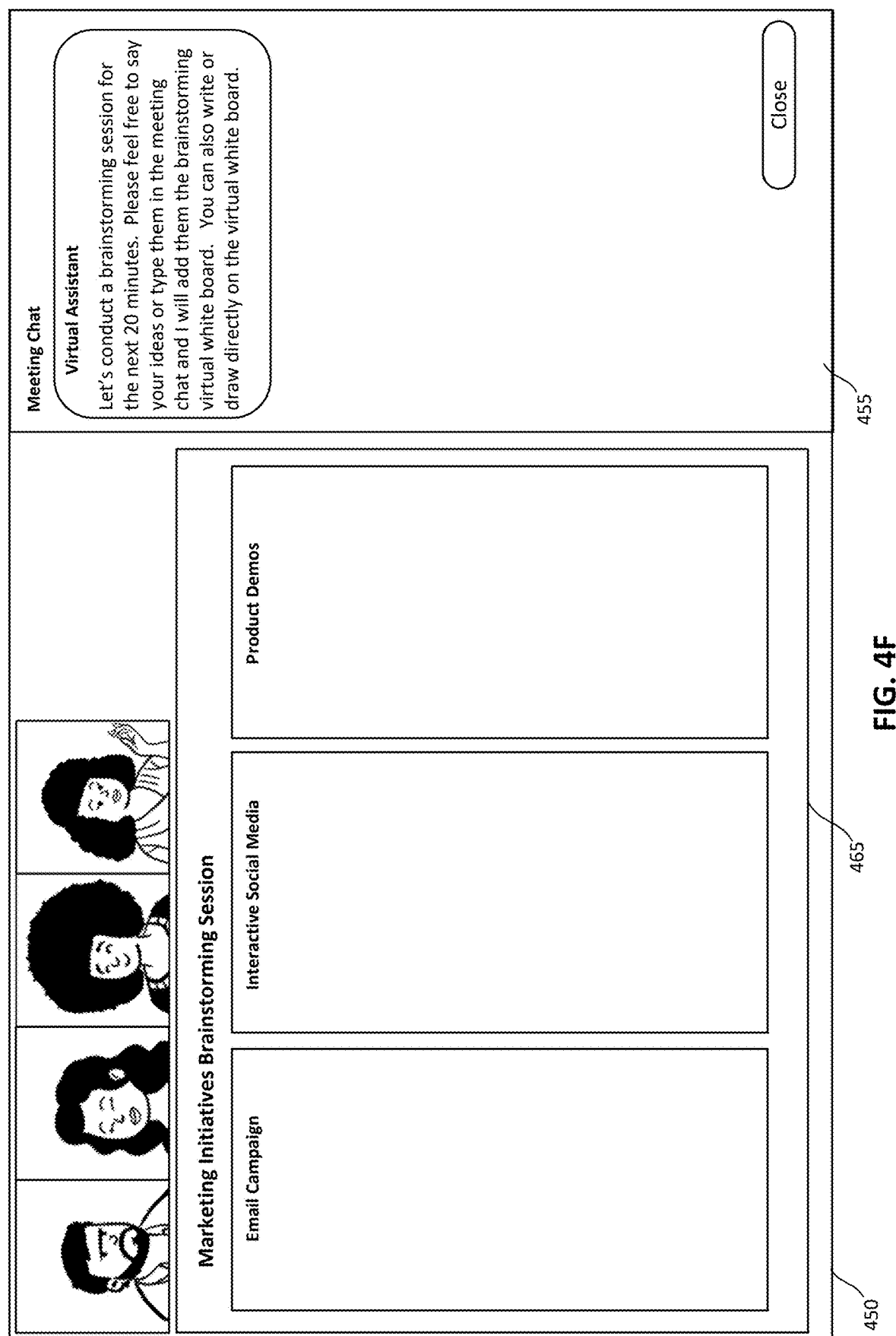

Meeting Chat

Virtual Assistant

Let's conduct a brainstorming session for the next 20 minutes. Please feel free to say your ideas or type them in the meeting chat and I will add them the brainstorming virtual white board. You can also write or draw directly on the virtual white board.

Close

Marketing Initiatives Brainstorming Session

Email Campaign

Interactive Social Media

Product Demos

Meeting Chat

Virtual Assistant

Let's conduct a brainstorming session for the next 20 minutes. Please feel free to say your ideas or type them in the meeting chat and I will add them the brainstorming virtual white board. You can also write or draw directly on the virtual white board.

Virtual Assistant

Great ideas, everyone! I have updated the whiteboard with the ideas you have provided so far.

We have 10 minutes left of the brainstorming session. Please let me know if you prefer to continue the brainstorming session or move on.

Close

Marketing Initiatives Brainstorming Session

Email Campaign

• Reach out to participants of user conference to highlight availability of new features requested by participants

Interactive Social Media

• Highlight use cases for new features included in new version of the software in weekly social media posts across multiple platforms
• Tailor the posts to the strength of each of the platforms
• Include links to demos and special offers on new product.

Product Demos

• Set up online demo of new features that is made available to current and potential users.
• Set up live demos (in person or in online meetings) to highlight new product features to existing high-volume corporate users that are tailored to the specific needs of those users.

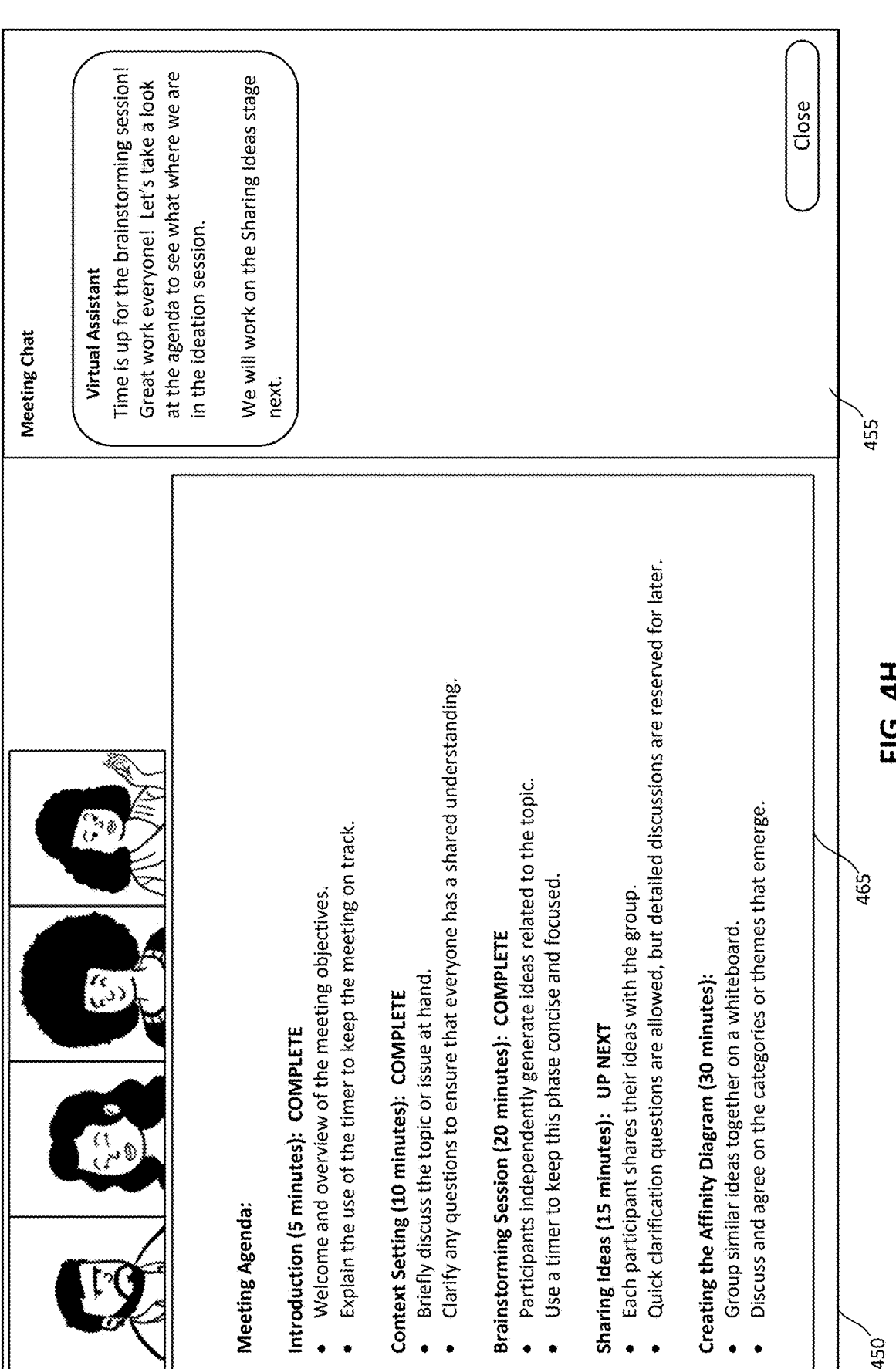

Meeting Chat

Virtual Assistant

Time is up for the brainstorming session! Great work everyone! Let's take a look at the agenda to see what where we are in the ideation session.

We will work on the Sharing Ideas stage next.

Close

Meeting Agenda:

Introduction (5 minutes): COMPLETE
- Welcome and overview of the meeting objectives.
- Explain the use of the timer to keep the meeting on track.

Context Setting (10 minutes): COMPLETE
- Briefly discuss the topic or issue at hand.
- Clarify any questions to ensure that everyone has a shared understanding.

Brainstorming Session (20 minutes): COMPLETE
- Participants independently generate ideas related to the topic.
- Use a timer to keep this phase concise and focused.

Sharing Ideas (15 minutes): UP NEXT
- Each participant shares their ideas with the group.
- Quick clarification questions are allowed, but detailed discussions are reserved for later.

Creating the Affinity Diagram (30 minutes):
- Group similar ideas together on a whiteboard.
- Discuss and agree on the categories or themes that emerge.

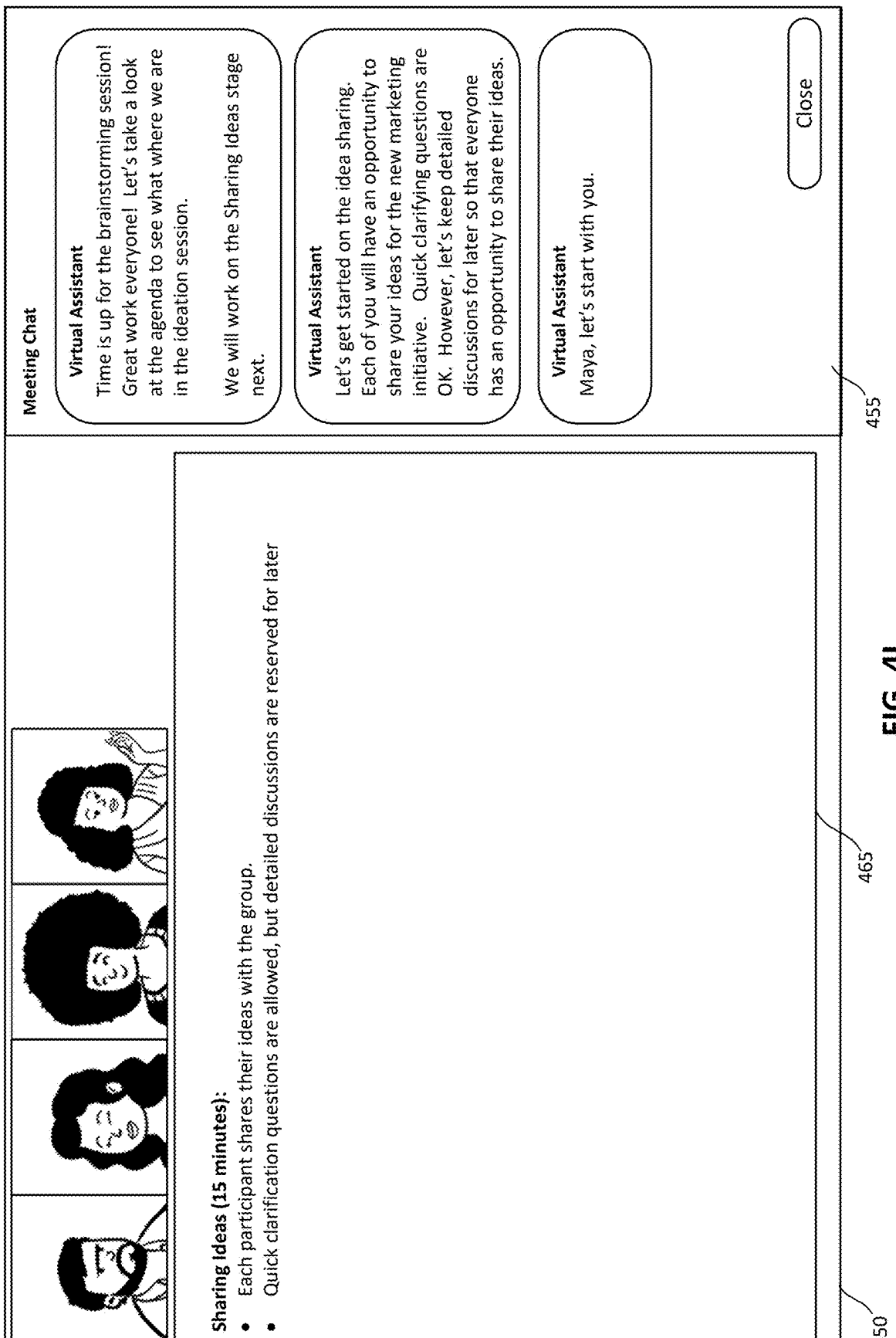

Meeting Chat

Virtual Assistant

Time is up for the brainstorming session! Great work everyone! Let's take a look at the agenda to see what where we are in the ideation session.

We will work on the Sharing Ideas stage next.

Virtual Assistant

Let's get started on the idea sharing. Each of you will have an opportunity to share your ideas for the new marketing initiative. Quick clarifying questions are OK. However, let's keep detailed discussions for later so that everyone has an opportunity to share their ideas.

Virtual Assistant

Maya, let's start with you.

Close

Sharing Ideas (15 minutes):
- Each participant shares their ideas with the group.
- Quick clarification questions are allowed, but detailed discussions are reserved for later

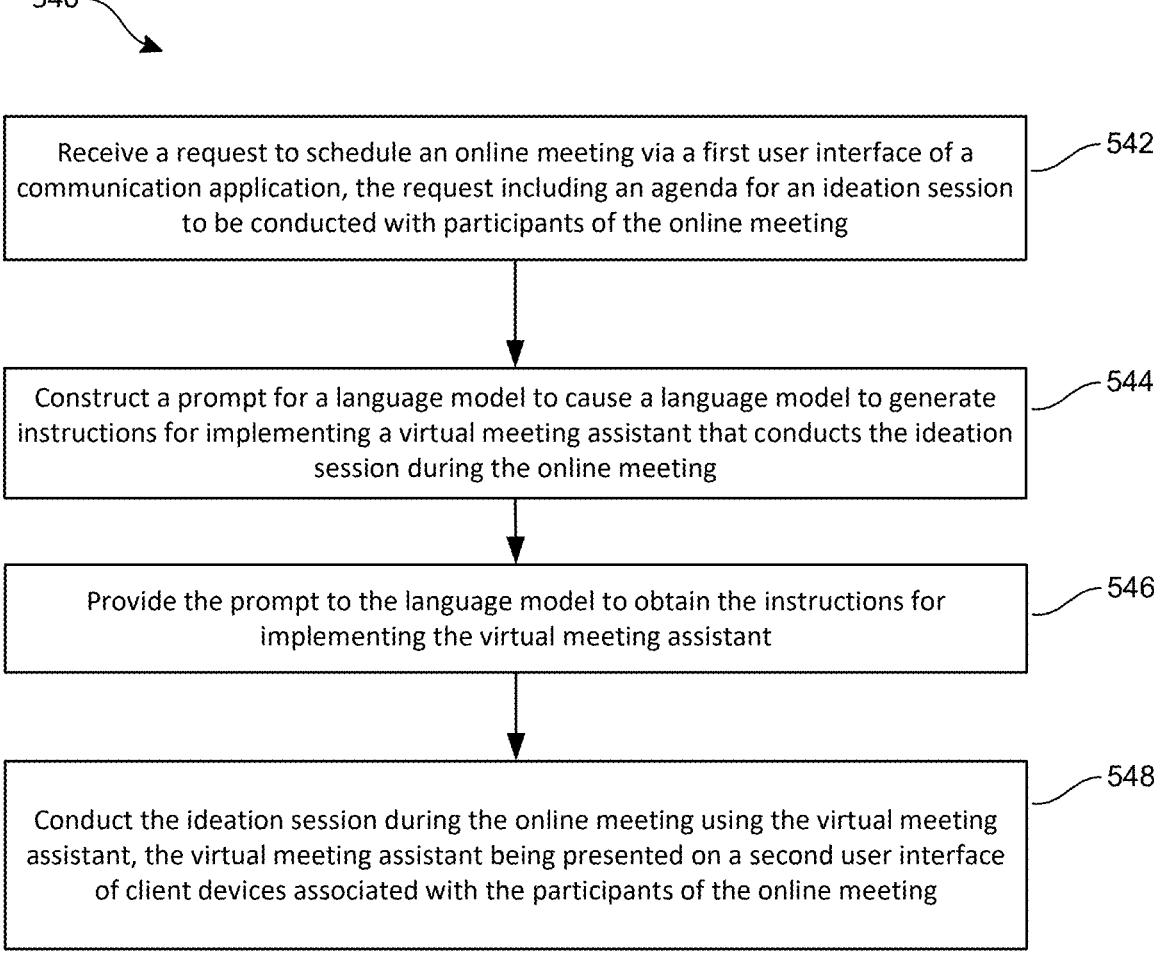

Receive a request to schedule an online meeting via a first user interface of a communication application, the request including an agenda for an ideation session to be conducted with participants of the online meeting — 542

Construct a prompt for a language model to cause a language model to generate instructions for implementing a virtual meeting assistant that conducts the ideation session during the online meeting — 544

Provide the prompt to the language model to obtain the instructions for implementing the virtual meeting assistant — 546

Conduct the ideation session during the online meeting using the virtual meeting assistant, the virtual meeting assistant being presented on a second user interface of client devices associated with the participants of the online meeting — 548

ARTIFICIAL INTELLIGENCE DRIVEN LEADING AND TEMPLATIZING OF IDEATION SESSION

BACKGROUND

Ideation is a process in which participants generate ideas and solutions through interactive sessions that utilize various techniques including but not limited to brainstorming, prototyping, sketching, storyboarding, and/or other such techniques. The purpose of an ideation session is to generate a large quantity of ideas that are then reduced down into a smaller set of most innovative and/or most practical ideas that inspire new design solutions and/or products. Ideation sessions can help to drive innovation. However, organizing and implementing such sessions is not always a straightforward process. An effective ideation session blends structured processes with the ability to improvise and adjust during the session. Hence, there is a need for improved systems and methods that provide means for automatically facilitating ideation sessions.

SUMMARY

An example data processing system according to the disclosure includes a processor and a memory storing executable instructions. The instructions when executed cause the processor alone or in combination with other processors to perform operations including detecting an occurrence of a trigger condition during an online meeting among a plurality of client devices associated with participants of the online meeting, the occurrence of the trigger condition indicating that an ideation session for collecting ideas from the participants should be initiated; selecting an ideation session template from among a plurality of ideation session templates based on meeting information associated with the online meeting, each ideation session template comprising a natural language prompt template that includes instructions to a language model to generate an agenda for a specific type of ideation session and to conduct the ideation session according to the agenda; constructing a prompt based on the natural language prompt template of the ideation session template that was selected; providing the prompt as an input to the language model to cause the language model to generate the agenda for the ideation session; and automatically conducting the ideation session according to the agenda.

An example method implemented in a data processing system includes detecting an occurrence of a trigger condition during an online meeting among a plurality of client devices associated with participants of the online meeting, the occurrence of the trigger condition indicating that an ideation session for collecting ideas from the participants should be initiated; selecting an ideation session template from among a plurality of ideation session templates based on meeting information associated with the online meeting, each ideation session template comprising a natural language prompt template that includes instructions to a language model to generate an agenda for a specific type of ideation session and to conduct the ideation session according to the agenda; constructing a prompt based on the natural language prompt template of the ideation session template that was selected; providing the prompt as an input to the language model to cause the language model to generate the agenda for the ideation session; and automatically conducting the ideation session according to the agenda.

An example data processing system according to the disclosure includes a processor and a memory storing executable instructions. The instructions when executed cause the processor alone or in combination with other processors to perform operations including receiving a request to schedule an online meeting via a first user interface of a communication application, the request including an agenda for an ideation session to be conducted with participants of the online meeting; constructing a prompt for a language model to cause a language model to generate instructions for implementing a virtual meeting assistant that conducts the ideation session during the online meeting; providing the prompt to the language model to obtain the instructions for implementing the virtual meeting assistant; and conducting the ideation session during the online meeting using the virtual meeting assistant, the virtual meeting assistant being presented on a second user interface of client devices associated with the participants of the online meeting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A-4I are diagrams showing an example user interface of an online communications platform application according to the techniques disclosed herein.

FIG. 5B is a flow chart of another example process for automatically conducting an ideation session according to the techniques disclosed herein.

DETAILED DESCRIPTION

Figure 1A:
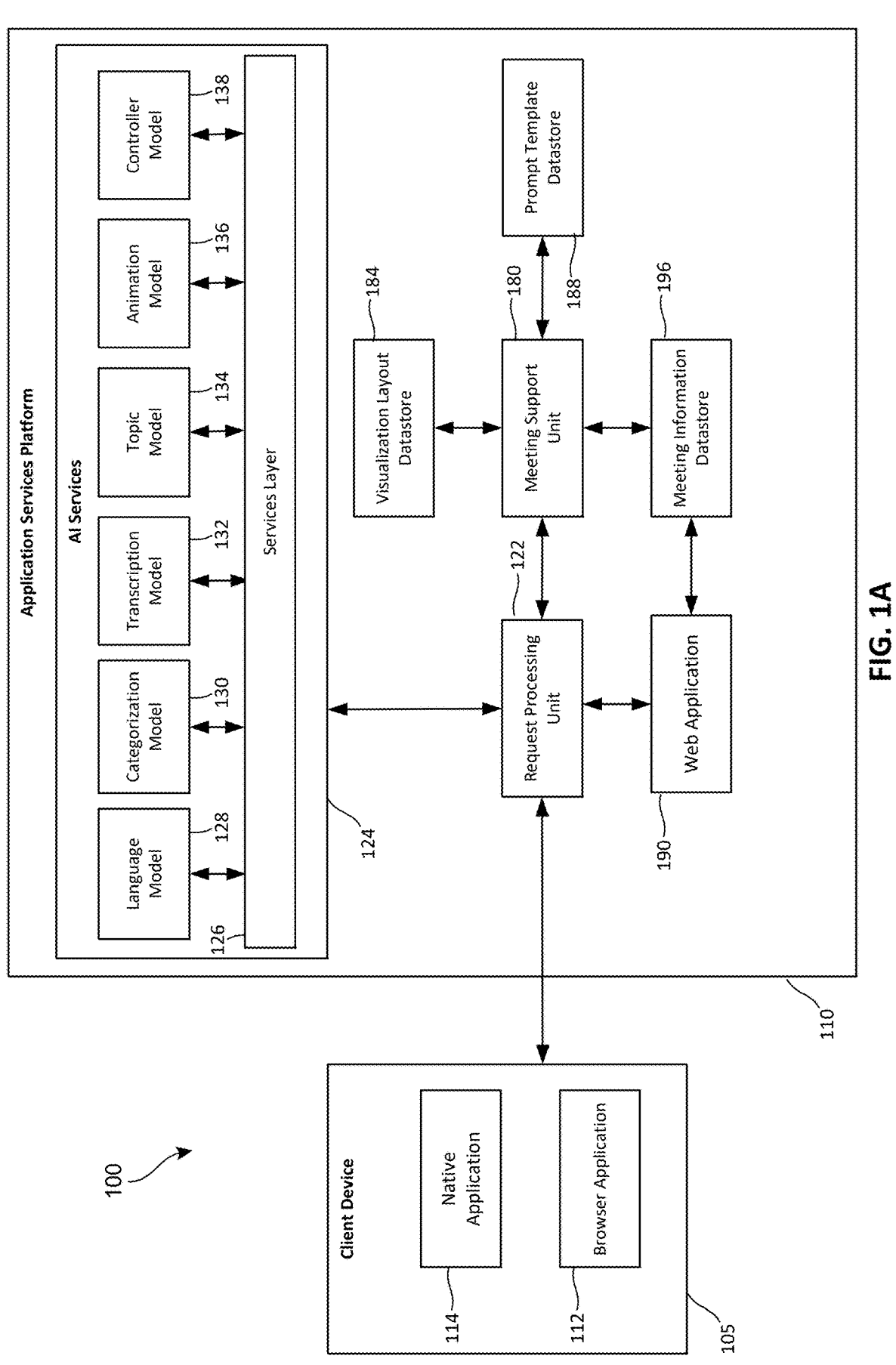
FIG. 1A is a diagram of an example computing environment in which the techniques for automatically generating visualizations of meeting content described herein are implemented.

Systems and methods for automatically facilitating ideation sessions for online meetings are described herein. These techniques provide a technical solution to the technical problem of how to automatically facilitate ideation sessions. Online communications platforms enable meeting participants to share ideas and collaborate on projects and provide an excellent platform for conducting ideation sessions in which participants generate and discuss a number of ideas and solutions that may be implemented. However, users are often unaware of how to organize and facilitate such ideation sessions or find it onerous to set up such as session. Furthermore, users may be unaware of the tool available on the communications platform to facilitate such sessions. The techniques herein utilize a language model to automatically generate and facilitate an agenda for an indention session. The language model generates the agenda based on information associated with the online meeting, such as but not limited to invitation information, participant information, and communications that occur before and/or during the online meeting. The language model then facilitates the idea session by encouraging users to participate in various stages of the ideation process. This encouragement is implemented as messages in a chat of the online meeting in some implementations, and the language model responds to spoken or typed responses from the meeting participants. In other implementations, the language model generates instructions that control an animated avatar of a virtual meeting assistant that provides spoken guidance to meeting participants and can respond to spoken or typed responses from the meeting participants. The language model also facilitates the ideation process by presenting an interactive collaboration tool that enables the participants to type, draw, write, or otherwise interact with the collaboration medium using a keyboard, mouse, stylus pen, touchscreen, voice, and/or other input. The collaboration medium can include but is not limited to a virtual white board, a word processing document, a set of slides for a presentation application, Microsoft Loop content, a two-dimensional or three-dimensional model, and/or other types of collaborative content. The language model monitors the various user interactions with the collaboration tool and updates the agenda and/or the contents of the collaboration tool in real time during the ideation session to provide an ideation session that dynamically adapts the needs of the participants. A technical benefit of this approach is that participant engagement and information retention can be increased by dynamically adapting agenda and/or the contents of the collaboration medium. Furthermore, this approach can help reduce the overall computing resources associated with creating the collaborative content by generating content that is predicted to be relevant to the participants of the online meeting based on transcription, chat messages, and other content associated with the online meeting. This approach provides the participants with a starting point during the ideation session that encourages discussion and collaboration rather than starting from a blank document in which the participants struggle to facilitate an ideation session that meets their needs, thereby consuming additional computing resources. These and other technical benefits of the techniques disclosed herein will be evident from the discussion of the example implementations that follow.

FIG. 1A is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to communications platforms, visualization and collaboration tools for collaboratively creating visual representations of information, and other applications for consuming and/or creating electronic content. In the implementation show in FIG. 1A, the functionality of the communications platform and the visualization and collaboration tools are integrated into a single set of applications. In contrast, in the example implementation of the computing environment 100 shown in FIG. 1B, the communications platform and the visualization and collaboration tools are implemented in separate applications that can be utilized together to provide a seamless user experience similar to that provided in the implementation shown in FIG. 1A. The client device 105 and the application services platform 110 communicate with each other over a network (not shown). The network may be a combination of one or more public and/or private networks and may be implemented at least in part by the Internet.

The application services platform 110 includes a request processing unit 122, artificial intelligence (AI) services 124, meeting support unit 180, a visualization layout datastore 184, a prompt template datastore 188, a web application 190, and meeting information datastore 196. The request processing unit 122 is configured to receive requests from the native application 114 of the client device 105 and/or the web application 190 of the application services platform 110. The requests may include but are not limited to requests to establish an online meeting and/or requests to create, view, and/or modify various types of electronic content, including creating visualizations of content of an online meeting and/or conducting AI driven ideation sessions as discussed in the examples which follow. In the example implementation shown in FIG. 1A, the communication platform functionality and the visualization and collaboration tool functionality are combined into a single set of applications. In some implementations, the web application 190 of the application services platform 110 implements this functionality. In other implementations, at least a portion of this functionality is implemented by the native application 114 of the client device 105. The request processing unit 122 also coordinates communication and exchange of data among components of the application services platform 110 as discussed in the examples which follow.

The meeting information datastore 196 is a persistent datastore in the memory of the application services platform 110 that stores information associated with an online meeting. The meeting information datastore 196 stores meeting invite information, participant information, recordings of meeting audio and/or video, transcripts of the meeting, contents of the meeting chat, file attachment information for files shared by participants of the online meeting, ideation session agendas, information collected during ideation sessions, visualization information for visualizations created during the online meeting including visualizations of information collected during ideation sessions, and/or other information associated with an online meeting. The visualization information can be used to populate an interactive collaboration tool that can be used to help facilitate the ideation sessions as discussed in the examples which follow. The meeting information datastore 196 is accessible to the native application 114, the web application 190, and/or the communications platform web application 192 to permit the participants to access the content associated with the online meeting both during and after the online meeting.

The visualization layout datastore 184 is a persistent datastore in a memory of the application services platform 110 that stores visualization layout templates for laying out various types of documents that may be used to create visualizations during an online meeting, including but not limited ideation sessions. The visualization layout templates can include templates for various types of visualizations that may be generated from the online meeting content to encourage engagement and contribution by the participants of the online meeting. The templates may include but are not limited to brainstorming session visualizations, pros and cons listings, affinity diagrams, and/or other types of visualizations that may be generated from the content of the online meeting and presented to the participants of the online meeting.

The prompt template datastore 188 is a persistent datastore in a memory of the application services platform 110 that stores natural language prompt templates that can be used by the meeting support unit 180 for causing the language model 128 and/or the other generative models of the AI services 124 to generate various types of content. For example, the prompt templates can include prompts instructing the language model 128 to generate textual content for various types of visualizations to be presented during an ideation session, prompts to cause the language model 128 to generate an agenda or modify an agenda for an ideation session, to generate a transcript for an avatar of a virtual meeting assistant and/or instructions to implement facial expressions, gestures, and/or other actions by the virtual meeting assistant. Other types of prompt templates may be stored in the prompt template datastore 188. These templates may be utilized by the meeting support unit 180 and/or other components of the application services platform 110.

The AI services 124 include a services layer 126, a language model 128, a meeting categorization model 130, a transcription model 132, a topic model 134, an animation model 136, and a controller model 138. Other implementations of the AI services 124 may implement a different set of models. Furthermore, some implementations of the AI services 124 are implemented on a remote server or servers that are separate from the application services platform 110, and the various components of the application services platform 110 that utilize the AI services 124 communicate with the AI services 124 over a network connection.

The language model 128 is a generative machine learning model trained to generate textual content in response to natural language prompts. The natural language prompts may be input by a user via the native application 114 or via the browser application 112. Various components of the application services platform 110 also construct natural language prompts that cause the language model to generate textual content. The language model 128 is implemented using a large language model (LLM) in some implementations. Examples of such models include but are not limited to a Generative Pre-trained Transformer 3 (GPT-3), or GPT-4 model. Other implementations may utilize other models or other generative models to generate textual content in response to user prompts. The language model 128 is used to generate content to facilitate ideation session and/or to generate visualizations used to facilitate the ideation sessions as discussed in the examples which follow.

The meeting categorization model 130 is a classification model that is trained to predict a meeting category from a set of meeting categories supported by the application services platform 110 for creating visualizations of the meeting content. The meeting categorization model 130 receives various types of textual input, such as but not limited to all or a portion of the meeting transcript, all or portion of the meeting chat, a number of meeting, attendee information (such as the job title, role, or other information), and/or information obtained from the calendar invite associated with the meeting. The information from the calendar invite may include but is not limited to a meeting title, a meeting description, and attached information and/or textual content extracted from the attachments to the calendar invite. The meeting categorization model 130 is trained to predict a meeting category from among the supported meeting categories based on the information available to the model. The prediction output by the meeting categorization model 130 is associated with a confidence score in some implementations, and the AI services 124 are configured to output an indication that the meeting category could not be determined if the confidence score is below a predetermined confidence score threshold.

The transcription model 132 is trained to receive audio content from an online meeting, to identify the speech included therein, and to output a written transcript of this speech. Some implementations of the transcription model 132 can identify which participant to the online meeting is speaking and add an identifier for that participant with the speech in the transcript so that someone reading the transcript can identify who said what.

The topic model 134 is a language model that is trained to receive a textual input and to determine a topic or topics associated with the textual input. The topic model 134 is provided an excerpt of the transcript and/or the chat messages associated with an online meeting to determine a topic. The topic being discussed by the participants can change over the course of the online meeting.

The animation model 136 receives instructions generated by the meeting support unit 180 to animate an avatar of a virtual meeting assistant. The meeting support unit 180 provides the animation model 136 with a transcript to be spoken by the virtual meeting assistant. The animation model 136 generates an animation of the virtual meeting assistant that is lip synchronized with the spoken text to make it appear that the virtual meeting assistant is speaking. The animation model 136 also animates the virtual meeting assistant to implement facial expressions, gestures, and/or other actions by the virtual meeting assistant. The meeting support unit 180 includes annotations in the text transcript provided to the animation model 136 to trigger the animation model 136 to perform specific facial expressions, gestures, and/or other actions by the virtual meeting assistant. The animation of the virtual presenter is presented on a user interface provided to participants of the online meeting on their respective client devices. The virtual presenter can be presented along with the video of the human participants of the online meeting. A technical benefit of this approach is that presenting the virtual meeting assistant as if it were a human participant to the meeting encourages engagement by the meeting participants to respond to the queries and suggestions that are presented by the virtual presenter.

The controller model 138 is a model that is used by the meeting support unit 180 to coordinate an ideation session.

The controller model 138 coordinates various aspects of the ideation session performed by the meeting support unit 180 including generating instructions for controlling the generation and/or updating of content presented by the interactive collaboration tool and the implementation of the AI-driven presence the virtual meeting administrator via voice-based and/or textual outputs and/or the animation of an avatar providing a representation of the virtual meeting administrator. The controller model also generates instructions for controlling a cursor and/or pointer on a user interface of the interactive collaboration tool. The instructions generated by the controller model 138 are provided as an input to various components of the meeting support unit 180 and/or the various models of the AI services 124 to facilitate the ideation session.

The controller model 138 is a generative model that is configured to generate instructions to various components of the meeting support unit 180 and/or the other models of the AI services 124. In some implementations, the controller model 138 is implemented by an LLM, such as but not limited to a GPT-3 or GPT-4 model, and the controller model 138 may be implemented using the same model as the language model 128. The meeting support unit 180 monitors the status of the communication session, the state of the interactive collaboration tool, and provides updates on the status of the communication and the state of the interactive collaboration tool to the controller model 138 for analysis enable the model to update the agenda as necessary, to implement the avatar of the virtual meeting administrator, to update the collaborative content presented by the interactive collaboration tool, and/or perform other actions to facilitate the ideation session.

The services layer 126 receives natural language prompts from the native application 114, the web application 190, the meeting support unit 180, the communications platform web application 192, and/or the visualization web application 194. The services layer 126 can receive natural language prompts input by users of the native application 114, the web application 190, the communications platform web application 192, and/or the visualization web application 194 and construct a prompt in a format that is recognized by the various models of the AI service 124. The services layer accesses a model-specific prompt template for each of the models of the AI services 124 from a pre-generated prompt datastore (not shown) and uses the template to generate a model-specific prompt for each model. The services layer 126 can also submit prompts that have been generated by one or more components of the application services platform 110, such as but not limited to the meeting support unit 180. In such implementations, the services layer 126 receives the prompt as an input and submits the prompt to the respective model or models for processing.

The meeting support unit 180 provides support for various aspects of the online meetings, such as but not limited automatically generating and/or modifying meeting agendas, facilitating ideation sessions, automatically generating visualizations based on visualization templates engineered for various types of ideation sessions, and/or other actions that facilitate the execution of online meetings. The meeting support unit 180 also maintains and monitors for the occurrence of trigger information that indicates when the meeting support unit 180 should perform certain actions, such as initiating an ideation session, generating and/or modifying the meeting agenda, and/or performing other such actions. Additional details of the meeting support unit 180 are discussed below with respect to FIG. 2.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementations illustrated in FIGS. 1A and 1B includes a single client device 105, other implementations may include a different number of client devices that utilize services provided by the application services platform 110.

The client device 105 includes a native application 114 and a browser application 112. The native application 114 is a web-enabled native application, in some implementations, that enables users to participate in online meetings including ideation sessions and collaborate with meeting participants in creating and/or modifying visualizations of content associated with the meeting. Such visualizations may be created by the application services platform 110 according to the techniques described herein. The web application 190 also enables users to participate in online meetings and collaborate with meeting participants in creating and/or modifying visualizations of content associated with the meeting. The browser application 112 can be used for accessing and viewing web-based content provided by the application services platform 110. In such implementations, the application services platform 110 implements one or more web applications, such as the web application 190, that enables users to participate in online meetings and collaborate with meeting participants in creating and/or modifying visualizations of content associated with the meeting. The application services platform 110 supports both the native application 114 and a web application 190 in some implementations, and the users may choose which approach best suits their needs.

Figure 1B:
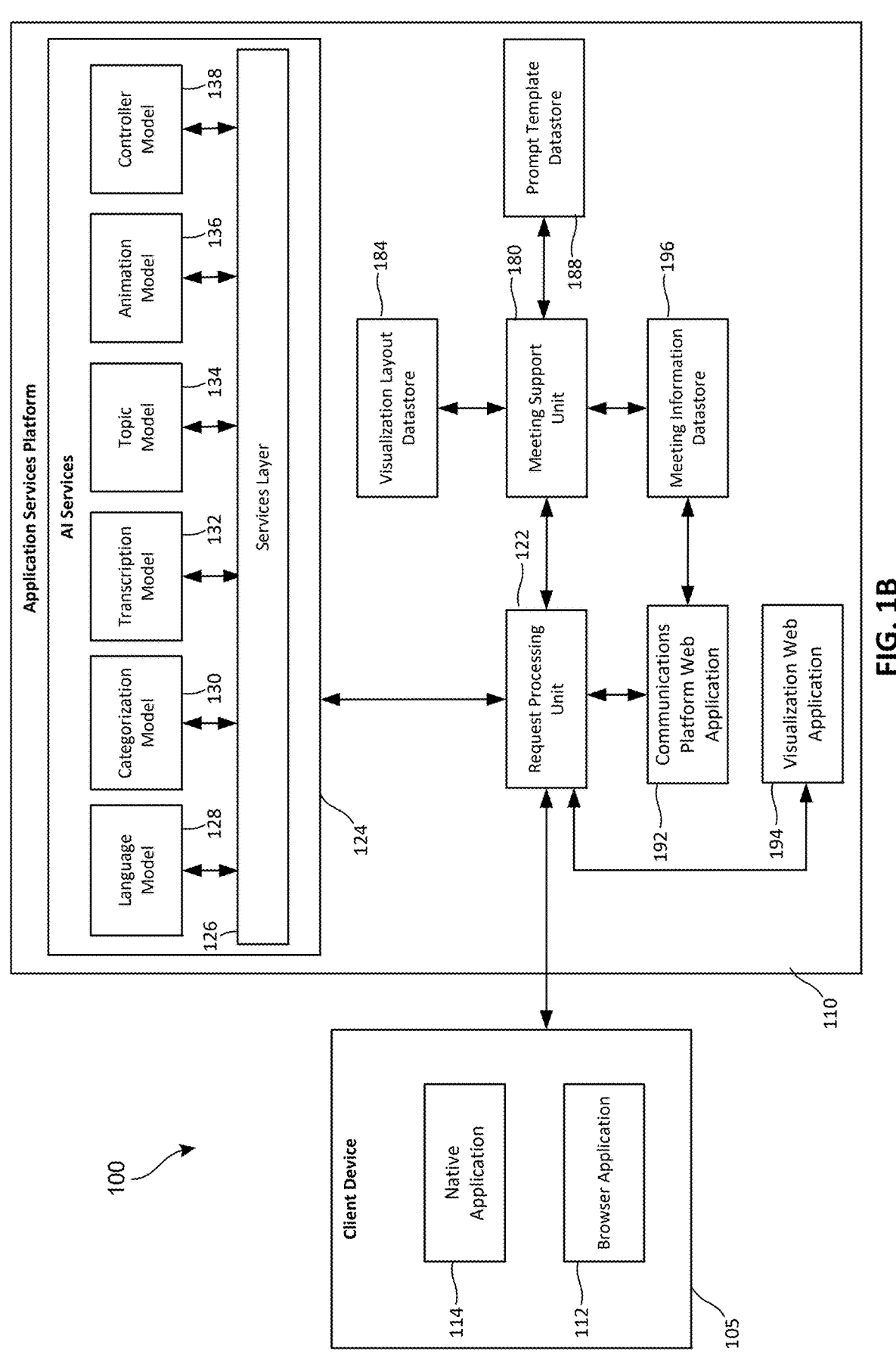
FIG. 1B is a diagram of another example computing environment similar to that shown in FIG. 1A in which the techniques for automatically generating visualizations of meeting content described herein are implemented but in which separate communications applications and visualization applications are implemented.

FIG. 1B is a diagram of another example of the computing environment 100 which is similar to the implementation shown in FIG. 1A. The example implementation shown in FIG. 1B, like the example implementation shown in FIG. 1A, can also be used to implement the techniques for automatically conducting ideation sessions described herein. However, the example implementation shown in FIG. 1B includes separate communications applications and visualization applications. Rather than a single web application 190 as in FIG. 1A, the example implementation of the application services platform 110 shown in FIG. 1B instead includes a communications platform web application 192 and a visualization web application 194. The communications platform web application 192 enables users to establish and/or participate in online meetings. The communications platform web application 192 can provide other services, such as but not limited to transcription of the speech detected in the audio portion of the online meeting, a chat features that enables participants invited to participate in an online meeting to exchange messages before, during, and/or after the online meeting, file sharing tools that enable participants to the online meeting to share files with other participants, and collaboration tools that enable the participants of the meeting to collaborate with other participants to the online meeting to create content. The collaboration tools can include creation of the visualization of the meeting content. In some implementations, the communications platform web application 192 is implemented by Microsoft Teams®. Other implementations can be implemented by other communications platforms. The communications platform web application 192 can integrate with other applications, such as the visualization web application 194 to provide additional services and/or functionality to participants of an online meeting. The visualization web application 194 presents an interactive collaboration tool that enables the meeting coordinator, meeting participants, and/or the virtual meeting assistant to collaboratively create and/or modify content to facilitate an ideation session. The collaboration tool can provide various types of collaboration mediums, such as but not limited to a virtual white board, a word processing document, a set of slides for a presentation application, Microsoft Loop content, a two-dimensional or three-dimensional model, and/or other types of collaborative content. In a non-limiting example, the visualization web application 194 provides a virtual white board that enables users to collaborate on a virtual white board in which the users can type, draw, write, or otherwise interact with the virtual white board using a keyboard, mouse, stylus pen, touchscreen, voice, and/or other input. The visualization web application 194 enables the meeting support unit 180 to create and/or modify the content of the virtual white board to facilitate ideation session as discussed herein. Participants to an online meeting can access the communications platform web application 192 and/or the visualization web application 194 using the browser application 112 of the client device. Changes to the content made by the virtual meeting assistant and/or by the meeting organizer and/or participants to the online meeting are synchronized among the plurality of client devices of the meeting organizer and/or participants in real time or substantially real time as the virtual white board content is updated.

The native application 114 in the example implementation FIG. 1B can implement at least a portion of the communications platform web application 192 locally on the client device 105. Some of the features and/or services provided by the native application 114 may be obtained from the communications platform web application 192. Furthermore, the visualization web application 194 can integrate with the native application 114 to provide the visualization functionality discussed above.

The remaining elements of the application services platform 110 shown in FIG. 1B not expressly described above function similarly to those described above with respect to the example implementation shown in FIG. 1A.

Figure 2:
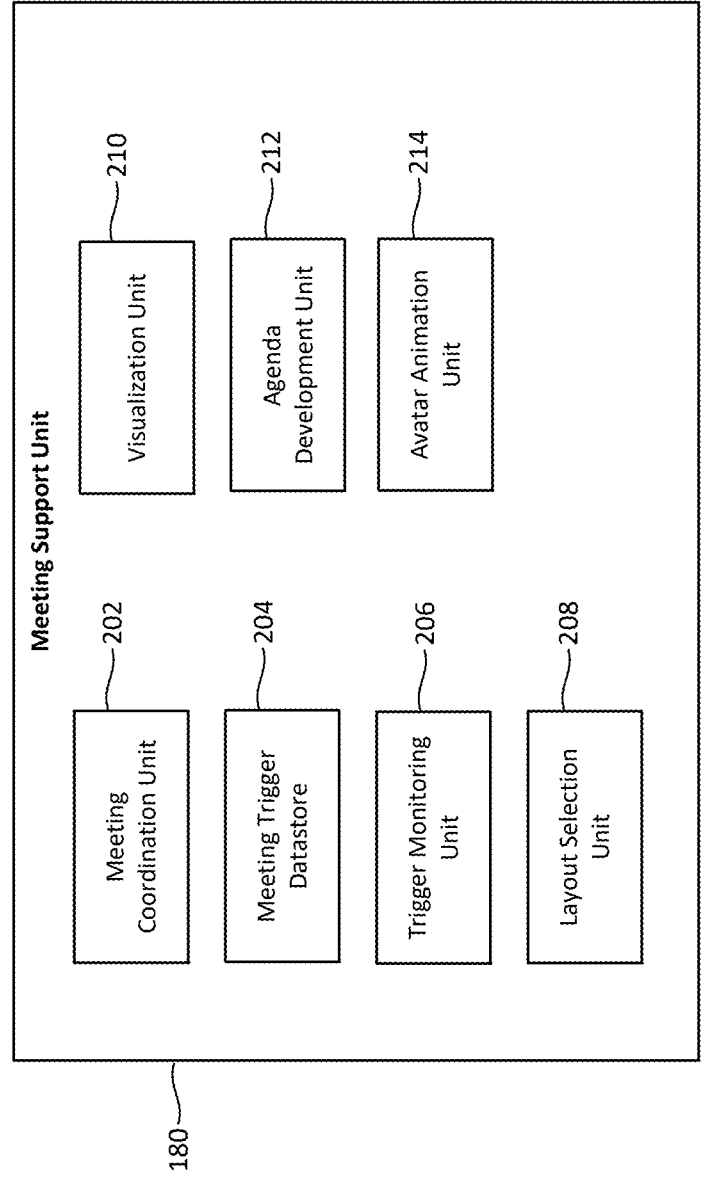
FIG. 2 is a diagram showing an example implementation of the meeting support unit of the application services platform 110 shown in FIGS. 1A and 1B.

FIG. 2 is a diagram showing an example implementation of the meeting support unit 180 of the application services platform 110 shown in FIGS. 1A and 1B. The meeting support unit 180 includes a meeting coordination unit 202, meeting trigger datastore 204, a trigger monitoring unit 206, a layout selection unit 208, a visualization unit 210, an agenda development unit 212, and an avatar animation unit 214. Other implementations of the meeting support unit 180 can include a different set of components.

The meeting coordination unit 202 coordinates performance of various aspects of an online meeting, such as responding to trigger conditions detected by the trigger monitoring unit 206, to cause the visualization unit 210 to generate visualizations of meeting content on an interactive collaboration tool including ideation session information, to cause the agenda development unit 212 to automatically generate and/or fine-tune a meeting agenda, and/or the avatar animation unit to animate an avatar of a virtual meeting assistant that help to facilitate the ideation session and/or other aspects of an online meeting. As discussed in the preceding examples, the meeting coordination unit 202 monitors the status of the communication session, the state of the interactive collaboration tool, and provides updates on the status of the communication and the state of the interactive collaboration tool to the controller model 138 for analysis to enable the model to trigger commands to the agenda development unit 212 update the agenda as necessary, to trigger the avatar animation unit 214 to implement and/or update the avatar of the virtual meeting administrator, to cause the visualization unit 210 create and/or update the collaborative content presented by the interactive collaboration tool, and/or generate commands to other components of the meeting support unit 180 and/or the application services platform 110 to perform other actions to facilitate the ideation session.

The meeting trigger datastore 204 is a persistent datastore in the memory of the application services platform 110 that stores trigger information for trigger conditions. The trigger monitoring unit 206 monitors for the occurrence of these trigger conditions during an online meeting and notifies the meeting coordination unit 202 of the occurrence of these conditions so that the meeting coordination unit 202 can take various actions to facilitate the online meeting. The trigger conditions are associated with various conditions are indicative of the intent of the participants of the application services platform 110 to have the application services platform 110 automatically initiate and facilitate an ideation session for the online meeting. An administrator may configure the specific trigger conditions included in the meeting trigger datastore 204 for a particular implementation. Furthermore, the meeting trigger datastore 204 may be populated with a set of default trigger conditions and the administrator may modify the default trigger conditions to suit the particular implementation.

Each trigger condition identifies one or more conditions that must occur to satisfy the trigger condition and one or more actions to be taken by the meeting coordination unit 202 in response to the trigger condition being satisfied. The trigger monitoring unit 206 notifies the meeting coordination unit 202 that a trigger condition has been satisfied and the one or more actions to be taken. The trigger conditions may be grouped into three categories: (1) manual start trigger conditions, (2) reactive start trigger conditions, and (3) proactive start trigger conditions. Manual start trigger conditions are based on a participant of an online meeting taking some action to cause the meeting coordination unit 202 to automatically initiate and facilitate an ideation session for the online meeting. In a non-limiting example, the participant clicks on or otherwise activates a control in the user interface of the communications platform application implemented by the native application 114, the web application 190, or the communications platform web application 192 that indicates that the participant would like to initiate the ideation session. The activation of the control indicates to the meeting coordination unit 202 that an ideation session should be initiated and facilitated by the meeting support unit 180 according to the agenda provided by the user. The user interface of the application can prompt the user to provide an agenda for the ideation session. Alternatively, the user may indicate that an agenda should be automatically generated for ideation session by the meeting coordination unit 202.

The reactive start trigger conditions are based on the content of the natural language prompts that the meeting organizer or other online meeting participant inputs during the online meeting. The natural language prompt may include questions, instructions, and/or certain key phrases that indicate that the participant wants the meeting coordination unit 202 to initiate and facilitate an ideation session for the online meeting.

The proactive start trigger conditions are based on various attributes of the online meeting. The proactive start trigger conditions can be based on the contents of the meeting transcript, the contents of meeting chat messages, calendar invite information for the online meeting, and/or other information associated with the online meeting and/or the participants and/or organizer thereof. The proactive start trigger conditions are conditions that are indicative that the participants of the online meeting may benefit from an ideation session. In a non-limiting example, the meeting coordination unit 202 service platform automatically suggests initiating an ideation session once enough information has been collected that a meeting category can be determined, and that meeting category is one in which an ideation session facilitated by the virtual meeting assistant is likely to be beneficial to the meeting participants. The length of the meeting transcript, the amount of time that has elapsed since the online meeting began, and/or the number of messages included in the meeting chat may all be indicative of the whether there is sufficient information available for the meeting categorization model 130 to predict the meeting category. The text of the calendar invite and/or the text of any attachments to the meeting invite and/or to the meeting chat may also include information indicative of the meeting category. In a non-limiting example, the meeting categorization model 130 determines that the online meeting is a product development meeting for a new line of product, and the meeting coordination unit 202 determines that an ideation session would be useful for assisting the meeting participants to develop ideas for this new product line. In another non-limiting example, the meeting categorization model 130 determines that the online meeting is a code review meeting with software engineers meeting to review code with new features and/or bug fixes for a software application. The meeting coordination unit 202 determines that an ideation session would not be useful for such an online meeting, because the goal of such meetings is to ensure that program code satisfy engineering best practices rather than conducting a brainstorming session.

The trigger monitoring unit 206 monitors participant inputs, the meeting transcript, the meeting chat, and other meeting related information discussed above. The trigger monitoring unit 206 accesses the meeting trigger datastore 204 to obtain the trigger condition information and analyzes the various inputs to determine whether any of the trigger conditions have been satisfied. If a trigger condition has been satisfied, the trigger monitoring unit 206 performs the one or more actions associated with that trigger condition. These actions may include initializing and facilitating an ideation session. The trigger monitoring unit 206 can also perform other actions, such as generating or modifying an agenda for an ideation session, initiating an avatar of a virtual meeting assistant to facilitate the ideation session, and/or other such actions related to the ideation session. Additional details of how the one or more actions are performed are described in greater detail in the examples which follow.

The layout selection unit 208 receives the predicted meeting category output by the meeting categorization model 130 and identifies the candidate visualization templates from the visualization layout datastore 184 to be used during an ideation session. The layout selection unit 208 may also select a visualization template based on the agenda for an ideation session created by the agenda development unit 212 and/or an agenda provided by the meeting organizer or other participant. The visualization templates may include templates for conducting ideation sessions, such as but not limited to a brainstorming session template, a pros and cons listing template, an affinity diagram template, and/or other types of visualization templates that may be generated from the content of the online meeting and presented to the participants of the online meeting. The layout selection unit 208 ranks the candidate visualization layouts selected for the meeting category based on a frequency with which the candidate visualization layouts are selected for that meeting category and selects a set of highest-ranking candidate visualization layouts to include in the set of candidate visualization layouts. The layout selection unit 208 selects a predetermined number of candidate visualization layouts to present to a participant or participants of the online meeting. In some implementations, an administrator is able to customize the predetermined number of candidate visualization layouts presented. The layout selection unit 208 causes the candidate visualization layouts to be presented on an interactive collaboration tool presented on a user interface of the communication platform application implemented by the native application 114, the web application 190, or the communications platform web application 192 depending upon the implementation of the application services platform 110. The participant may then select the layout of the visualization to be generated. The language model 128 of the AI services 124 is used to generate, at least in part, the content for the visualization based on the visualization template selected by the participant. Alternatively, in some implementations, the layout selection unit 208 automatically selects the visualization template to be utilized for the visualization. Additional details of the generation of the visualization are described in greater detail in the examples which follow.

The visualization unit 210 maintains the state of the visualization information used to populate the interactive visualizations provided by the interactive collaboration tool, such as a virtual white board, can be automatically updated based on the ongoing conversation in the online meeting. In some implementations, the visualization unit 210 stores information about the current topic of conversation, as determined by the topic model 134. The visualization unit 210 obtains an excerpt of the transcript and/or the chat messages associated with the online meeting and provides the excerpts to the topic model 134 for analysis. The visualization unit 210 periodically checks for a change in topic in some implementations. In a non-limiting example, every m minutes, the visualization unit 210 obtains an excerpt of the transcript and/or the chat messages reflecting the last m minutes and provides the excerpted information to the AI services 124 for analysis by the topic model 134. The current topic output by the topic model 134 is compared with the previous topic. If the topic has not changed, the visualization unit 210 causes the trigger monitoring unit 206 to check whether a layout synchronization trigger condition has been satisfied so that the trigger monitoring unit 206 will update the visualization content of the current visualization with additional information included in the transcript and/or chat since the visualization information was last updated. Otherwise, if the topic has changed, the visualization unit 210 provides an indication to the trigger monitoring unit 206 that a layout change trigger condition has occurred, which indicates that the topic has changed, and a new visualization can be created for the new topic.

The agenda development unit 212 accesses the prompt template datastore 188 to obtain a prompt template for the language model 128 that instructs the language model 128 to generate an agenda for the ideation session. The agenda development unit 212 customizes the prompt template with various information associated with the online meeting. This information can include but is not limited to one or more of the following: a transcript or excerpt thereof of one or more previous online meetings, messages or an excerpt thereof from the meeting chat of one or more previous online meetings, information from the calendar invite, the number of meeting attendees, and the job titles of the attendees. The agenda development unit 212 provides the agenda to the visualization unit 210 to cause the visualization unit 210 to present the agenda on the user interface of the client devices 105 of the meeting organization and/or other participants to an online meeting. The agenda development unit 212 also provides the meeting agenda to the meeting coordination unit 202 so that the meeting coordination unit 202 can facilitate the ideation session, including generating the information utilized by the avatar animation unit 214 to animate the avatar of the virtual meeting assistant.

The avatar animation unit 214 implements the avatar of a virtual meeting assistant. The meeting coordination unit 202 constructs and submits a prompt to the language model 128 to cause the language model 128 to generate an animation transcript for the avatar animation unit 214 to speak. The transcript can be generated in response to spoken or typed inputs by the meeting participants, based on a specific stage of the meeting agenda that is being performed, and/or other information associated with the online meeting. The avatar animation unit 214 provide the animation transcript to the animation model 136 as an input. The animation model 136 generates an animation of the virtual meeting assistant that is lip synchronized with the spoken text to make it appear that the virtual meeting assistant is speaking. The animation model 136 also animates the virtual meeting assistant to implement facial expressions, gestures, and/or other actions by the virtual meeting assistant.

Figure 3A:
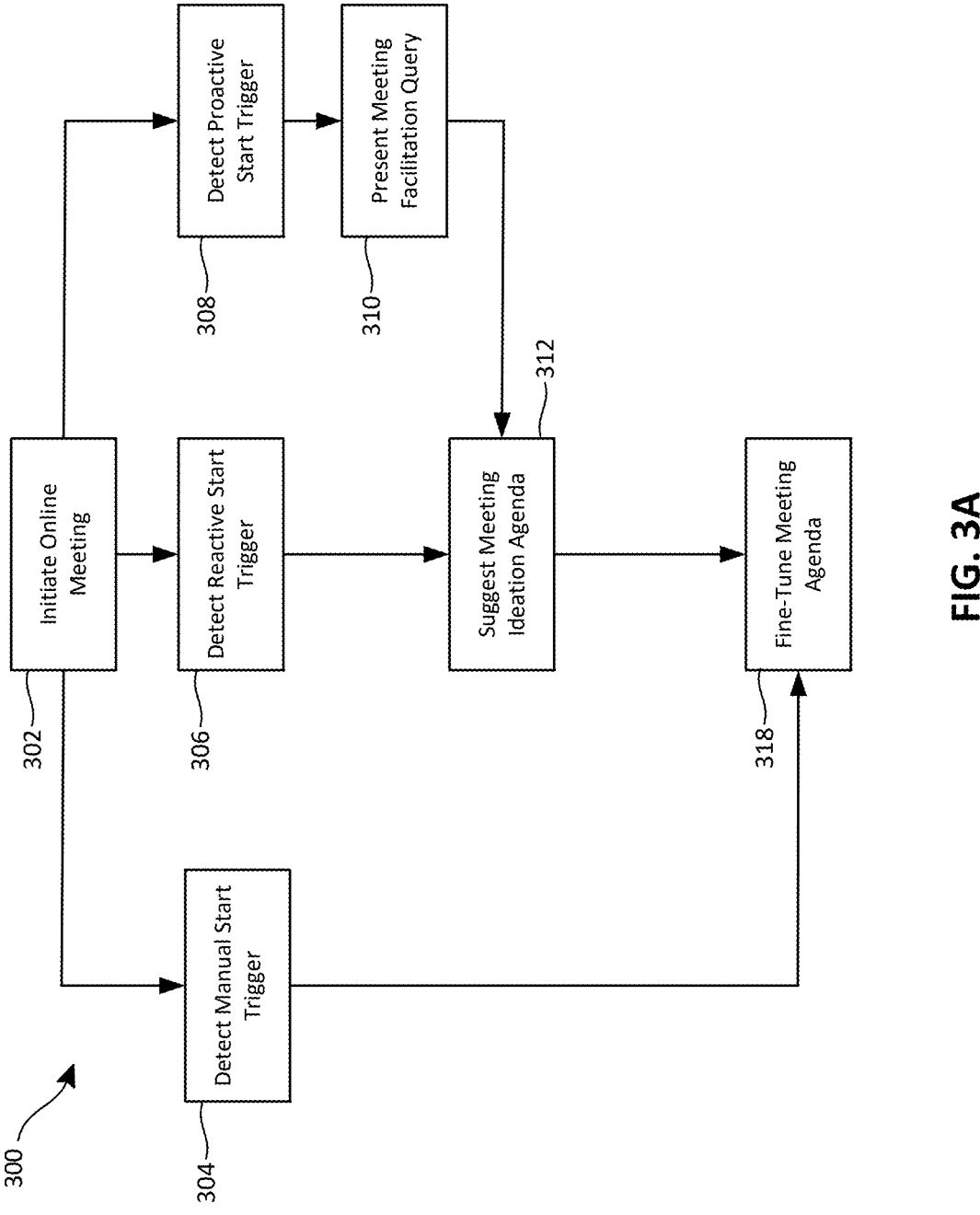
FIG. 3A is a flow diagram showing an example process for automatically conducting an ideation session for an online meeting according to the techniques provided herein.

FIG. 3A is a flow diagram showing an example process 300 for automatically conducting an ideation session for an online meeting according to the techniques provided herein. The process 300 can be implemented by the meeting support unit 180 of the application services platform to generate and/or fine-tune an agenda for an ideation session, while the process 350 shown in FIG. 3B can be implemented by the meeting support unit 180 for facilitating the ideation session based on the agenda.

The process 300 includes an operation 302 of initiating the online meeting. The operation 302 may be automatically executed by the application services platform 110 at the time at which the online meeting is scheduled in a calendar invite. In other implementations, the operation 302 is performed in response to an organizer of the meeting accessing the communication platform via the native application 114, the web application 190, or the communications platform web application 192 and initiating the meeting. The client devices 105 of the other participants to the online meeting may then connect to the online meeting in response the participants clicking on or otherwise activating a control in the user interface of the communications platform application that request to join to online meeting. The organizer of the online meeting must admit the participants to the online meeting in some implementations.

The process 300 then continues with the trigger monitoring unit 206 monitoring the online meeting as discussed in the preceding examples to determine whether a trigger condition has been satisfied. In operation 304, the trigger monitoring unit 206 detects a manual start trigger condition has been satisfied. In operation 306, the trigger monitoring unit 206 detects that a reactive start trigger condition has been satisfied. In operation 308, the trigger monitoring unit

206 detects that a proactive start trigger condition has been satisfied. The process 300 continues to operation 312 in response to the trigger monitoring unit 206 detecting that a manual start trigger condition, or a reactive start trigger condition has been satisfied. However, the process 300 continues to operation 310 in response to the trigger monitoring unit 206 detecting that a proactive start trigger condition has been satisfied. In operation 310, the meeting organizer or another participant of the online meeting is prompted whether an ideation session should be initialized and automatically facilitated for the online meeting. The trigger monitoring unit 206 causes a prompt to be presented on a user interface of the client device 105 of the organizer or other participant. The organizer or other participant can then respond via the prompt with an indication that the ideation session should be initialized or an indication that the visualization should not be created. If the participant indicates that the visualization should be created, the process 300 proceeds to operation 312. Otherwise, if the participant indicates that the visualization should not be created, the trigger monitoring unit 206 continues to monitor for the occurrence of a trigger condition. The participant may be the organizer of the online meeting, or another participant selected to make the decision whether the visualization should be automatically generated. The participant who is prompted by the trigger monitoring unit 206 may be a participant in the online meeting that is currently speaking at the time that the trigger monitoring unit 206 determines that the proactive start trigger has been satisfied.

In operation 312, the meeting support unit 180 uses the agenda development unit 212 to develop a proposed agenda for the ideation session. The agenda development unit 212 accesses the prompt template datastore 188 to obtain a prompt template for the language model 128 that instructs the language model 128 to generate an agenda for the ideation session. The agenda development unit 212 customizes the prompt template with various information associated with the online meeting. This information can include but is not limited to one or more of the following: a transcript or excerpt thereof of one or more previous online meetings, messages or an excerpt thereof from the meeting chat of one or more previous online meetings, information from the calendar invite, the number of meeting attendees, and the job titles of the attendees. The transcript and/or messages from one or more previous online meetings are included because this information provides context to the language model 128 whether the meeting organizer and/or the participants of the online meeting participated in ideation session in previous meetings and may be more likely to want to participant in an ideation session during the online meeting. The information from the calendar invite can include text of the calendar invite, information extracted from documents attached to the calendar invite, and/or notes associated with the calendar invite. This information can provide context to the language model 128 to help determine an agenda for the ideation session. The agenda development unit 212 can also obtain topic information from the topic model 134 and/or the meeting categorization model 130 and include the topic and/or category information in the prompt to generate the meeting agenda.

The agenda development unit 212 provides the customized prompt to the AI services 124 for processing by the language model 128, and the agenda development unit 212 obtains the agenda generated by the language model 128. The agenda development unit 212 provides the agenda to the native application 114, the web application 190, the communications platform web application 192, and/or the visualization web application 194 to present the agenda the meeting organizer and/or other participants to the online meeting and opportunity to provide feedback on the proposed agenda.

In operation 304, the meeting organizer or other participant of the online meeting provides a proposed agenda for an ideation session rather than requesting that an agenda be automatically generated for the ideation session. This predefined agenda is presented on a user interface of the native application 114, the web application 190, the communications platform web application 192, and/or the visualization web application 194.

Figure 3B:
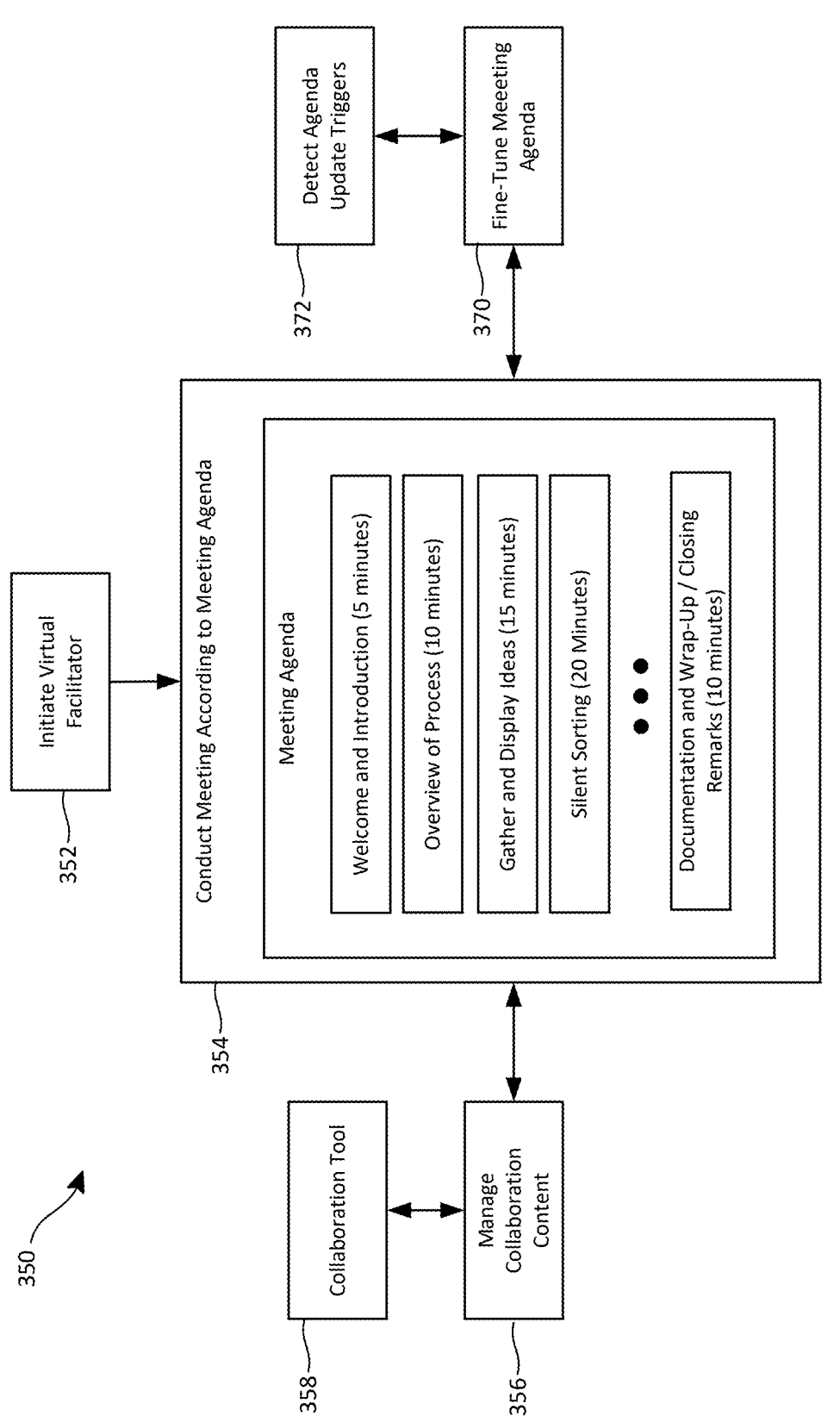
FIG. 3B is a flow diagram showing an example process for automatically conducting an ideation session for an online meeting according to the techniques provided herein.

The meeting organizer and the participants can provide feedback on the manually generated agenda received in operation 304 or the automatically generated from operation 312 in the form of natural language prompts that are either typed or spoken, and the agenda development unit 212 constructs another prompt to the language model 128 to cause the language model 128 to amend the meeting agenda according to the feedback received. This process of amending the agenda can go through multiple iterations as the agenda is fine tuned in operation 318. Once the agenda has been fine-tuned (if necessary), the meeting support unit 180 can facilitate the ideation session. FIG. 3B shows an example process 350 in which the meeting support unit 180 facilitates the ideation session according to the agenda.

FIG. 3B is a flow diagram showing an example process 350 for automatically conducting an ideation session for an online meeting according to the techniques provided herein. The process 350 can be implemented by the meeting support unit 180 of the application services platform. The process 350 can be used to facilitate an ideation session in an online meeting based on an agenda obtained according to the process shown in FIG. 3A.

The process 350 includes an operation 352 in which the avatar of the virtual meeting assistant is initialized. The meeting coordination unit 202 generates a transcript and/or animation information for the virtual meeting assistant using the language model 128 as discussed above. The virtual meeting administrator is animated avatar that facilitates the ideation session using spoken prompts to the meeting participants. The avatar animation unit 214 generates the animation of the avatar speaking, performing facial expressions, gestures, and/or other actions by the virtual meeting assistant.

In operation 354, the virtual meeting assistant conducts the ideation session according to the meeting agenda. The example implementation shown in FIG. 3B includes an example meeting agenda that will be followed by the virtual meeting assistant. The virtual meeting administrator leads the ideation session by presenting spoken content generated by the language model 128. As discussed in the preceding examples, the meeting coordination unit 202 and the controller model 138 continually monitor the status of the communication session and the state of the interactive collaboration tool to provide updates to the avatar animation unit 214 so that the avatar of the virtual meeting assistant can respond to textual, voice, drawn, or other inputs by the participants of the ideation session in substantially real time. Updates are also provided to the agenda development unit 212 to facilitate updates to the agenda based on events occurring during the ideation session.

In operation 356, the meeting coordination unit 202 also manages the collaboration content of the collaboration tool 358. The collaboration tool 358 provides one or more collaboration mediums that enable the meeting coordinator, the meeting participants, and/or the meeting coordinator unit

202 to add, modify, and/or delete content. The collaboration mediums can include but are not limited to a virtual white board, a word processing document, a set of slides for a presentation application, Microsoft Loop content, a two-dimensional or three-dimensional model, and/or other types of collaborative content. The meeting coordination unit 202 can analyze spoken and/or textual inputs provided by the meeting coordinator and/or the other meeting participants using the language model 128 and cause the visualization unit 210 to update the contents of the collaboration tool 358 accordingly. The meeting organizer and/or the other meeting participants can also write and/or draw on a user interface provided by the collaboration tool 358, and the meeting coordination unit 202 analyzes these user inputs using the language model 128 to obtain a summary of these inputs. The meeting coordination unit 202 can then use this information in operation 372 to determine whether the meeting agenda may need to be updated and/or whether the meeting participants are ready to move on to another stage of the ideation session. This information can be used in operation 370.

In operation 372, the trigger monitoring unit 206 monitors the contents of various inputs, such as but not limited to the meeting transcript, the meeting chat, verbal commands and/or commands input in the meeting chat from the meeting organizer or other participants to the online meeting, manual edits that the meeting participants have made to the contents of the interactive collaboration tool 358, and/or other information. The trigger monitoring unit 206 can access the trigger information in the meeting trigger datastore 204 for triggers that are associating with updating the meeting agenda during the ideation session from the meeting trigger datastore 204. The trigger monitoring unit 206 notifies the meeting coordination unit 202 and/or the agenda development unit 212 that the meeting agenda needs to be updated in response to one or more of these triggers being satisfied. This approach creates a feedback loop that enables the ideation session agenda to be fine-tuned in operation 370 based on the user feedback captured in the transcript, meeting chat, commands, and/or inputs via the interactive collaboration tool 358. The meeting coordination unit 202 and/or the agenda development unit 212 can construct one or more prompts to the language model 128 instructing the language model to generate an updated version of the ideation session agenda. A technical benefit of this approach is that the AI-driven ideation session is not static and can adapt to the needs of the meeting organizer and/or other meeting participants in real time during the online meeting. Once the agenda has been completed, the meeting coordination unit 202 can construct one or more prompts to the language model 128 to cause the language model to generate a summary of the ideation session and/or other documents based on information collected from meeting participants and/or generated by the language model 128 during the ideation session.

Figure 4A:
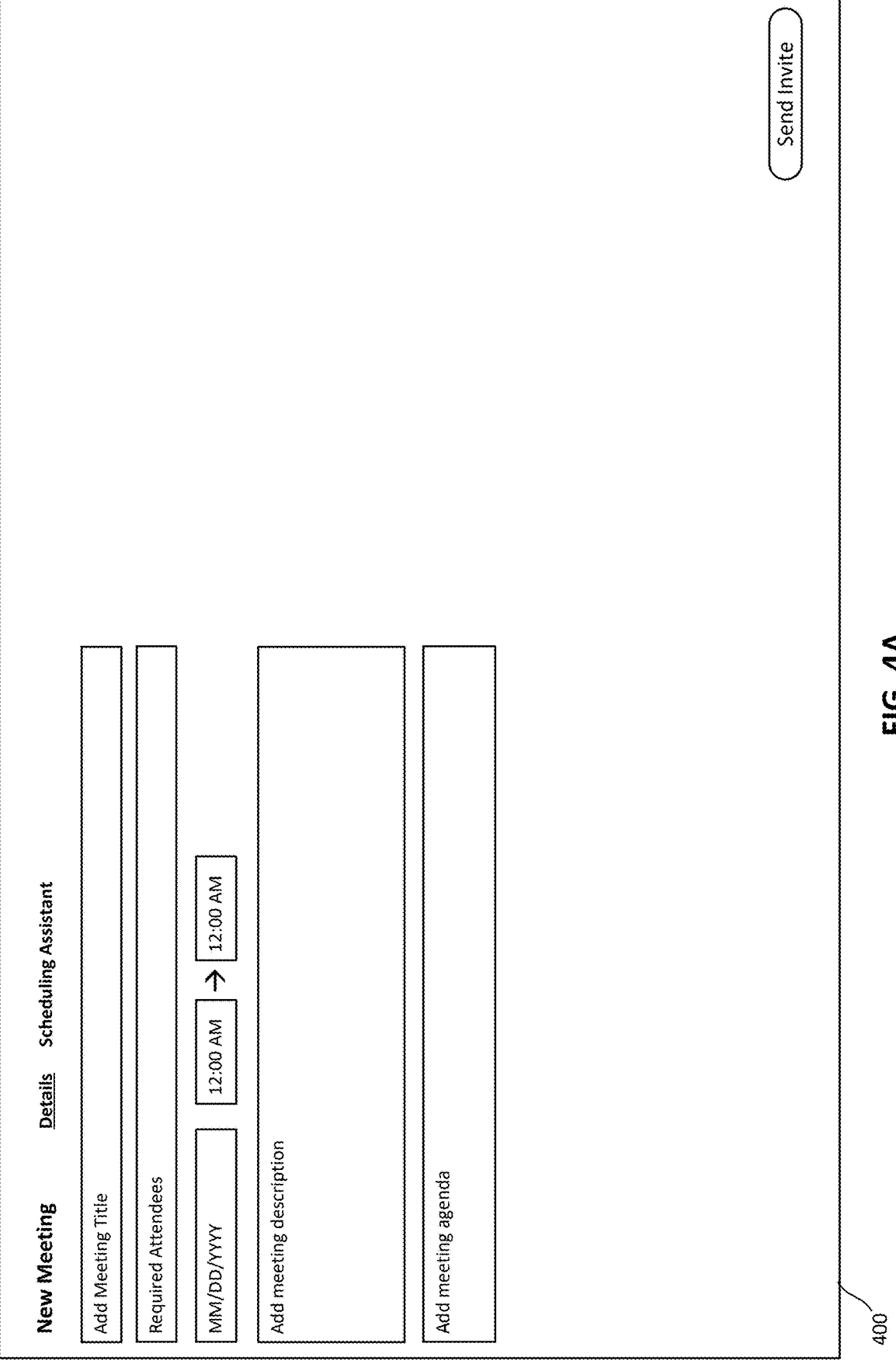

FIG. 4A-4I are diagrams showing an example user interface of an online communications platform application according to the techniques disclosed herein. FIG. 4A shows an example user interface 400 that enables a user to set up an online meeting. The user interface 400 enables the user to enter a title for the meeting, invite meeting participants, select the meeting date and time, enter a meeting description, and add an option meeting agenda. The user interface 400 may be implemented by the native application 114, the web application 190, and/or the communications platform web application 192 discussed above.

Figure 4B:
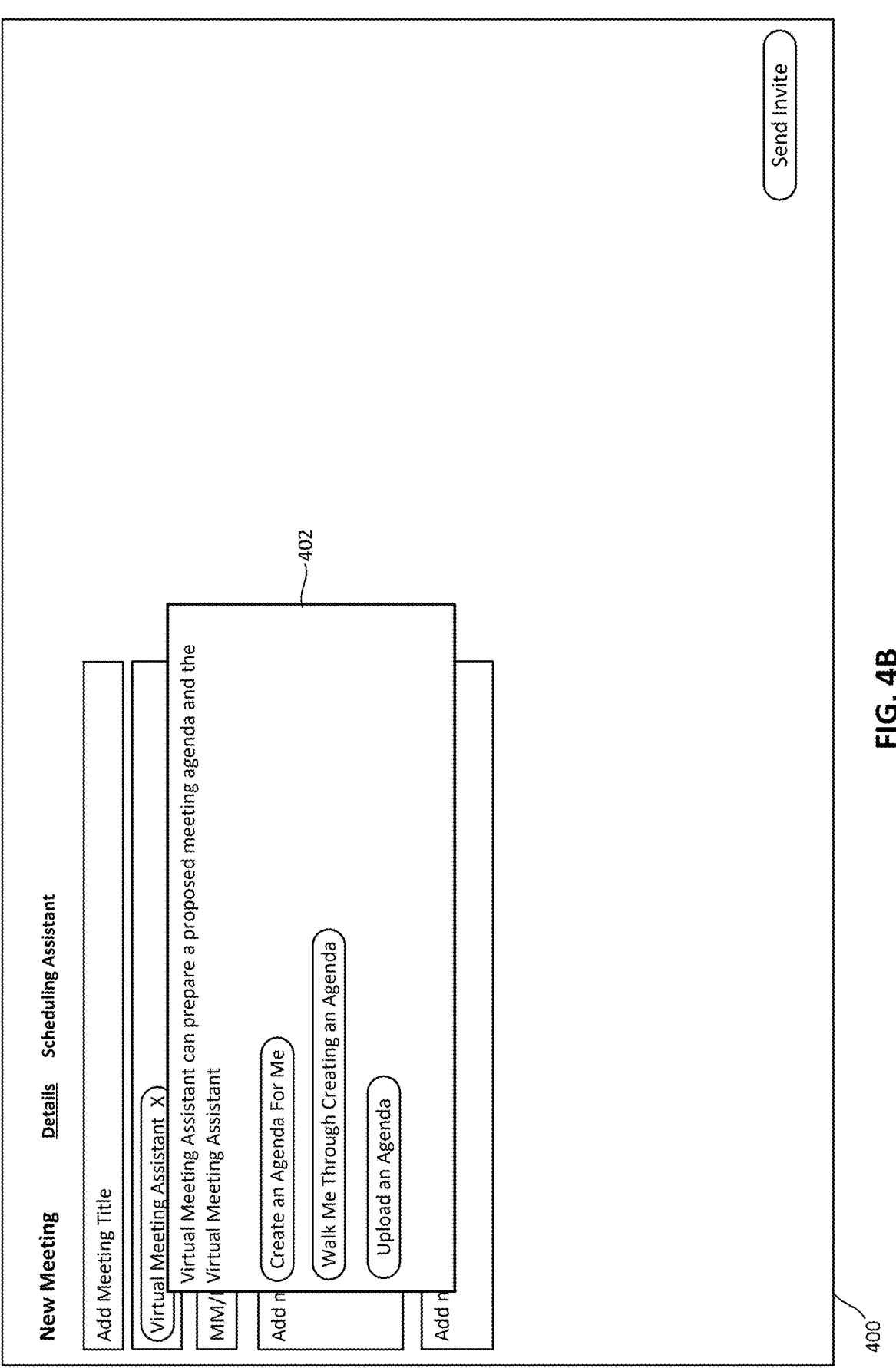
Figure 4C:
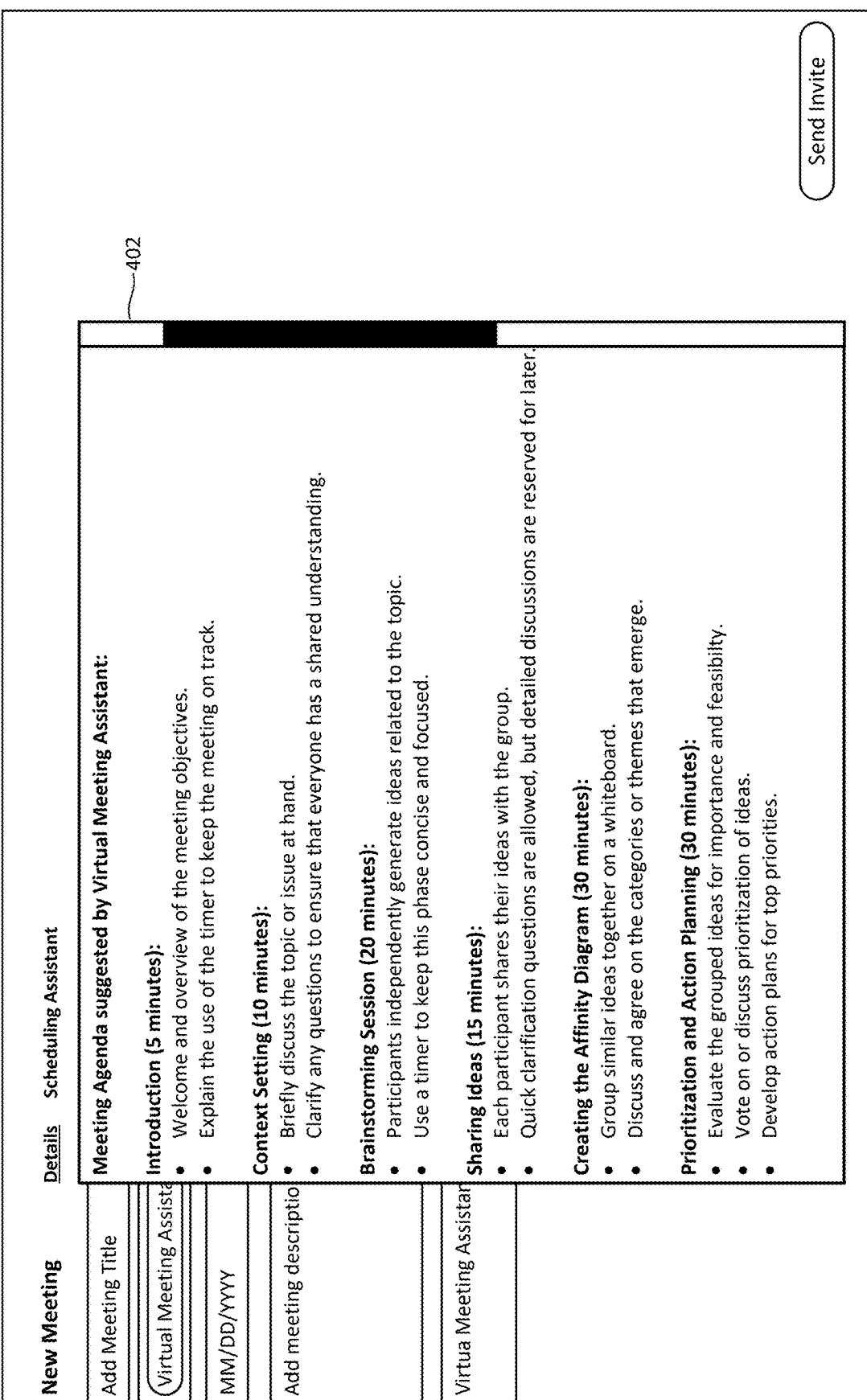
Figure 4D:
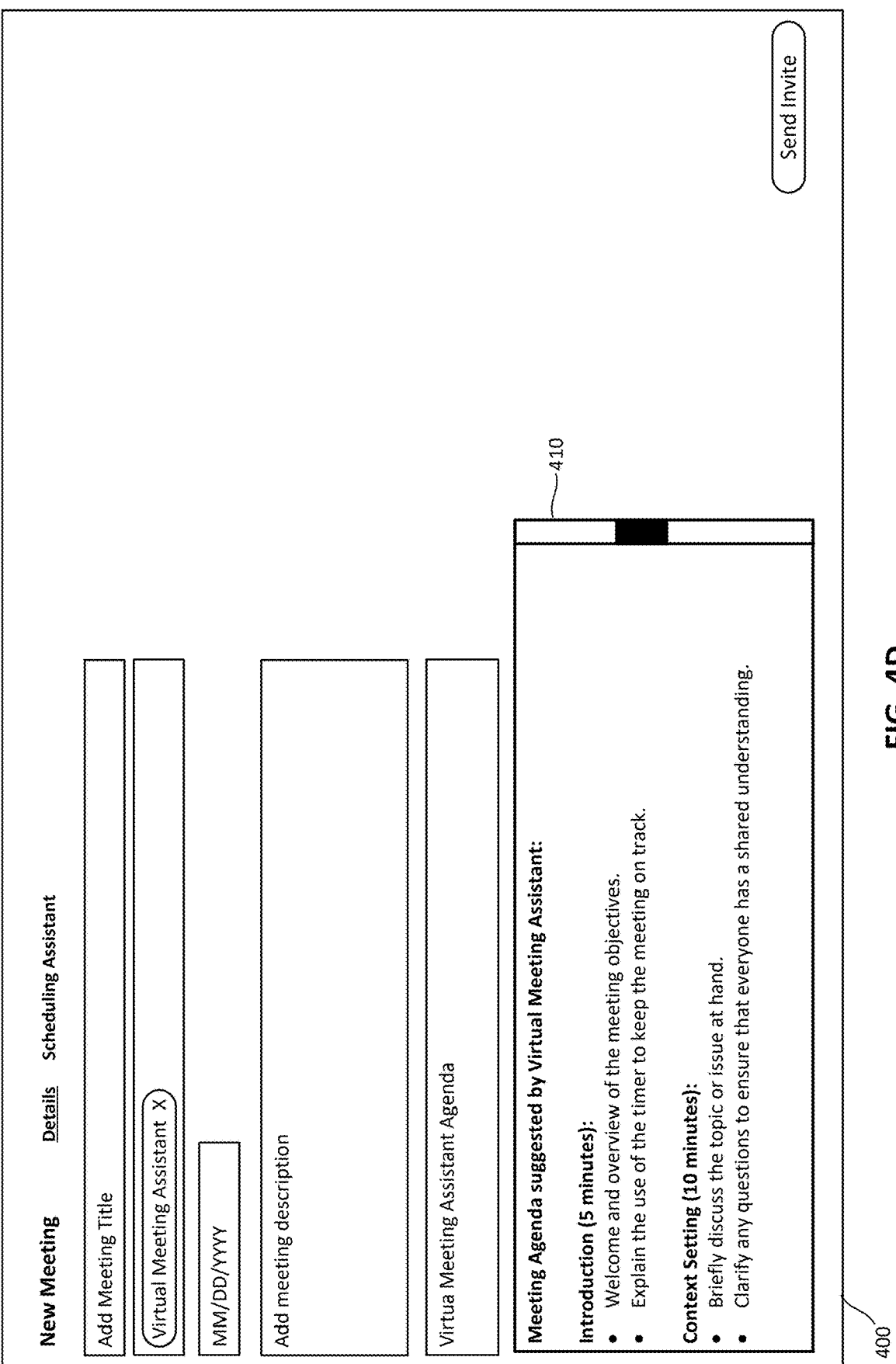

FIG. 4B shows an example of the user interface 400 of an online communication platform in which the user has invited the virtual meeting assistant as a participant to the online meeting. As discussed in the preceding examples, the meeting organizer can invite the virtual meeting assistant to facilitate the aspects of the online meeting. For example, the meeting organizer can invite the virtual meeting assistant to enable the virtual meeting assistant to facilitate an ideation session. FIG. 4B shows an agenda pane 402 that has been displayed in response to inviting the virtual meeting assistant. The agenda pane 402 presents options to the meeting organizer for creating a meeting agenda with the assistance of the virtual meeting presenter or uploading an agenda that has been created in advance. The agenda development unit 212 can generate the meeting agenda as discussed in the preceding examples. The virtual meeting presenter can also guide the meeting organizer through creating an agenda via a chat interface. The virtual meeting presenter obtains a proposed agenda from the agenda development unit 212 in some implementations, presents the proposed agenda to the meeting organizer in the chat interface, and enables the meeting organizer to refine the proposed meeting agenda through a series of natural language prompts input via the chat interface. FIG. 4C shows an example of an agenda that has been suggested by the virtual meeting assistant. The meeting organizer can accept this agenda or provide feedback to cause the virtual meeting assistant to further refine the agenda as discussed above. FIG. 4D shows an example of the user interface 400 in which the user has accepted the agenda, and the agenda is presented in the agenda field 410.

FIGS. 4E and 4F show an example user interface 450 of the online communication platform that is presented to the meeting organizer and the other meeting participants once the online meeting has been initiated. The virtual meeting assistant is facilitating an ideation session in this example. The virtual meeting assistant can output content into the meeting chat pane 455 as shown in FIG. 4E and can also be animated by the avatar animation unit 214 to present an animated avatar that is lip synched with spoken prompts as discussed in the preceding examples. FIG. 4F shows an example of the user interface 450 in which the virtual meeting assistant is facilitating a brainstorming session as part of an ideation session. The collaboration tool pane 465 shows contents of the virtual white board that the users can write on or draw on. The contents of the white board can also be updated automatically by the meeting support unit 180 as the meeting participants interact with the virtual meeting assistant via spoken language and/or inputs typed into the meeting chat. The virtual meeting assistant can facilitate the ideation session by prompting meeting participants to participate in the ideation process. The meeting support unit 180 uses the language model 128 to analyze the inputs provided by the meeting participants and can fine tune the meeting agenda based on the user feedback. While the example implementation shown in FIG. 4F show an example of white board being provided as an interactive collaboration tool, other implementations provide other types of collaboration mediums, such as but not limited to a word processing document, a set of slides for a presentation application, Microsoft Loop content, a two-dimensional or three-dimensional model, and/or other types of collaborative content. FIG. 4G show an example of user interface 450 in which the virtual assistant has updated the contents of the collaboration tool pane 465 based on the inputs received from the participants to the ideation session. FIG. 4H shows an example of the user interface 450 in which the virtual assistant has concluded the brainstorming session shown in the preceding example and has presented the ideation session agenda to the participants. FIG. 4I shows an example of the user interface 450 in which the virtual assistant facilitates the next stage of the ideation session and prompts the users to participate in this stage of the ideation session. The examples shown in FIGS. 4A-4I provide one example of the virtual meeting assistant facilitating an ideation session. The specific agenda, stages of the ideation session, the user interfaces, and the prompts provided by the virtual meeting assistant may vary in other implementations.

Figure 5A:
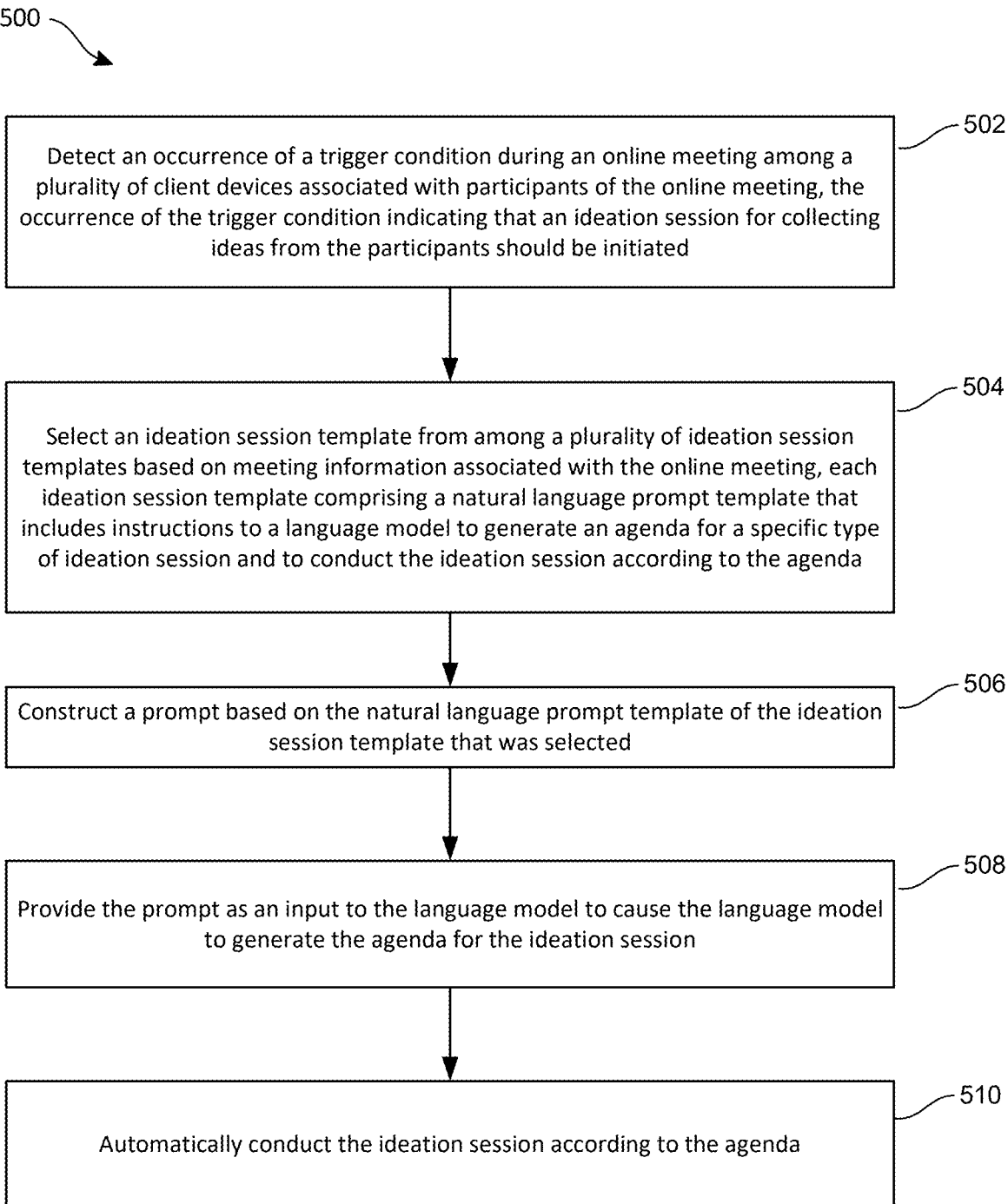
FIG. 5A is a flow chart of an example process for automatically conducting an ideation session according to the techniques disclosed herein.

FIG. 5A is a flow chart of another example process 500 for automatically conducting an ideation session according to the techniques disclosed herein. The process 500 can be implemented by the meeting support unit 180 of the application services platform 110 as discussed in the preceding examples.

The process 500 includes an operation 502 of detecting an occurrence of a trigger condition during an online meeting among a plurality of client devices associated with participants of the online meeting. The occurrence of the trigger condition indicating that an ideation session for collecting ideas from the participants should be initiated. As discussed in the preceding examples, the trigger monitoring unit 206 detects the occurrence of the trigger conditions and notifies the meeting coordination unit 202 to coordinate the ideation session.

The process 500 includes an operation 504 of selecting an ideation session template from among a plurality of ideation session templates based on meeting information associated with the online meeting, each ideation session template comprising a natural language prompt template that includes instructions to a language model to generate an agenda for a specific type of ideation session and to conduct the ideation session according to the agenda. The The process 500 includes an operation 506 of constructing a prompt based on the natural language prompt template of the ideation session template that was selected. The meeting coordination unit 202 generates a prompt to the language model 128 that causes the language model 128 to generate agenda for the ideation session.

The process 500 includes an operation 508 of providing the prompt as an input to the language model to cause the language model to generate the agenda for the ideation session and an operation 510 of automatically conducting the ideation session according to the agenda. The meeting coordination unit 202 interacts with the various components of the meeting support unit 180 to animate the avatar of the virtual meeting assistant that leads the ideation session.

FIG. 5B is a flow chart of another example process 540 for automatically conducting an ideation session according to the techniques disclosed herein. The process 540 can be implemented by the meeting support unit 180 of the application services platform 110 as discussed in the preceding examples.

The process 500 includes an operation 542 of receiving a request to schedule an online meeting via a first user interface of a communication application. The request including an agenda for an ideation session to be conducted with participants of the online meeting. As discussed in the preceding examples, the meeting organizer can provide an agenda to be used by the meeting support unit 180 to conduct the ideation session. FIGS. 4A-4D show an example of such a user interface.

The process 500 includes an operation 544 of constructing a prompt for a language model to cause a language model to generate instructions for implementing a virtual meeting assistant that conducts the ideation session during the online meeting and an operation 546 of providing the prompt to the language model to obtain the instructions for implementing the virtual meeting assistant. As discussed in the preceding examples, the meeting support unit 180 constructs one or more prompts for the language model 128 to cause the language model 128 to generate various content used to implement the virtual meeting assistant and/or the interactive collaboration tool.

The process 500 includes an operation 548 of conducting the ideation session during the online meeting using the virtual meeting assistant. The virtual meeting assistant is presented on a second user interface of client devices associated with the participants of the online meeting. FIGS. 4E and 4F show an example of such a user interface on which virtual meeting assistant conducts the ideation session.

The detailed examples of systems, devices, and techniques described in connection with FIGS. 1A-5B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-5B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
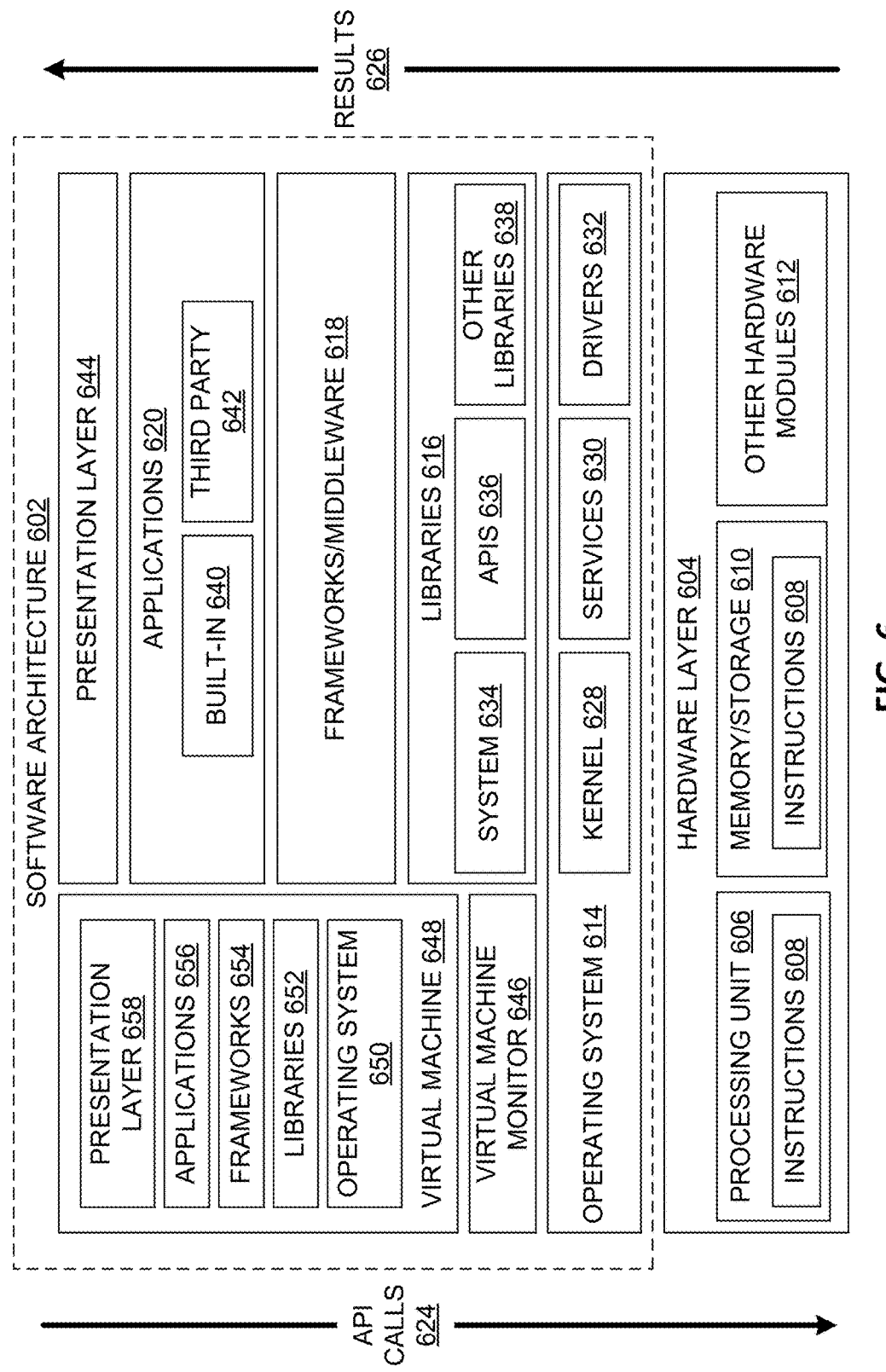
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory/storage, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks/middleware 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks/middleware 618 provide a higher-level common infrastructure that may be used by the applications 620 and/or other software modules. For example, the frameworks/middleware 618 may provide various graphic user interface (GUI) functions, high-level resource management, or high-level location services. The frameworks/middleware 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks/middleware 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
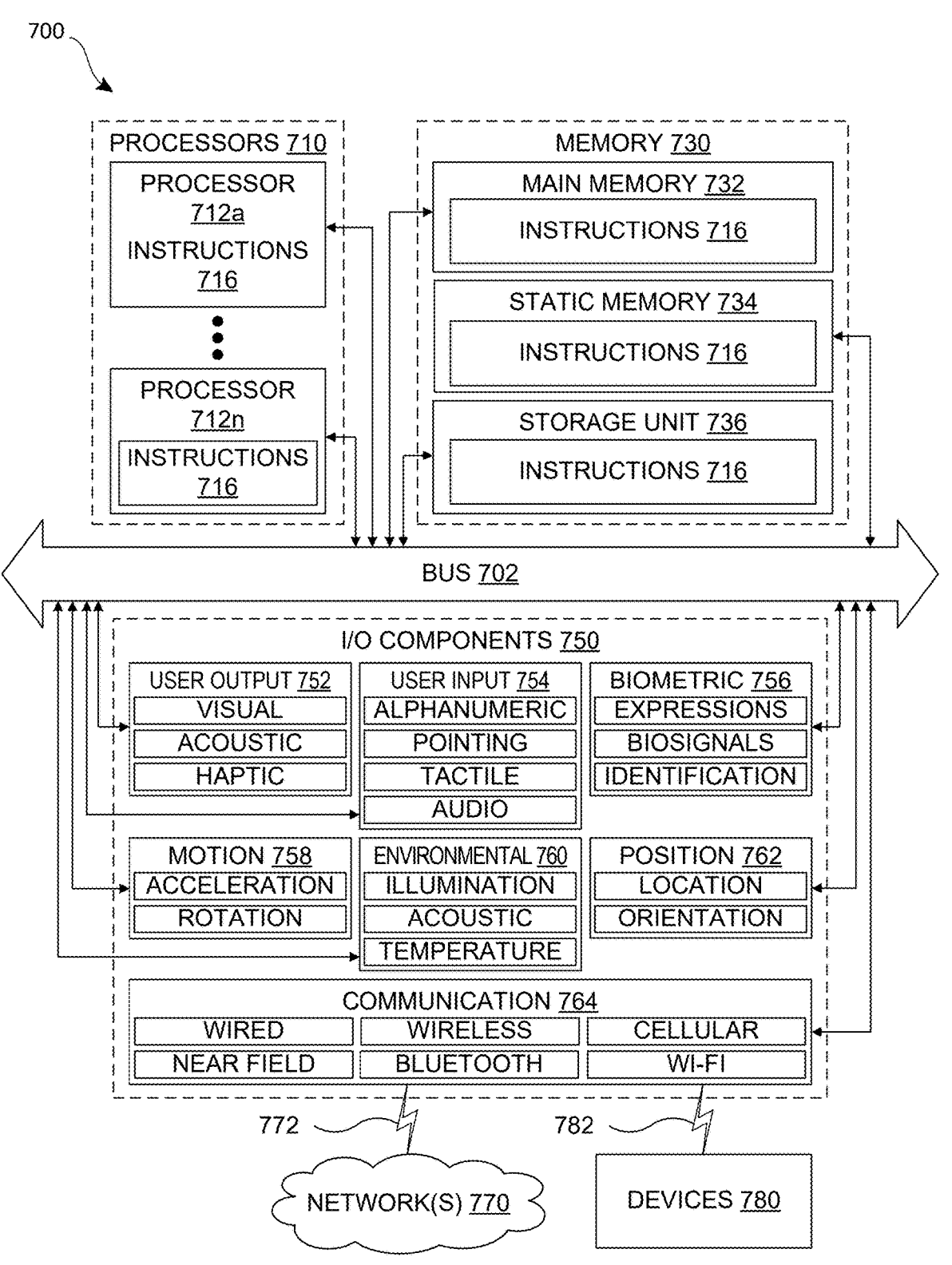
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory/storage 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory storing executable instructions that, when executed, cause the processor alone or in combination with other processors to perform operations of:
      detecting an occurrence of a trigger condition during an online meeting among a plurality of client devices associated with participants of the online meeting, the occurrence of the trigger condition indicating that an ideation session for collecting ideas from the participants should be initiated;
      selecting an ideation session template from among a plurality of ideation session templates based on meeting information associated with the online meeting, each ideation session template comprising a natural language prompt template that includes instructions to a language model to generate an agenda for a specific type of ideation session and to conduct the ideation session according to the agenda;
      constructing a prompt based on the natural language prompt template of the ideation session template that was selected;
      providing the prompt as an input to the language model to cause the language model to generate the agenda for the ideation session; and
      automatically conducting the ideation session according to the agenda.

2. The data processing system of claim 1, wherein detecting the occurrence of the trigger condition further comprises:
   detecting an indication received from a control of a user interface of a communications application on a client device of a participant of the online meeting indicating that the participant has requested that the ideation session be initiated.

3. The data processing system of claim 1, wherein detecting the occurrence of the trigger condition further comprises:
   analyzing natural language prompts using the language model to detect a use of one or more trigger words, phrases, or questions that indicate that the ideation session should be initiated, the natural language prompts being submitted through a user interface of a communication application on a client device of a participant of the online meeting; and receiving an output from the language model indicating the occurrence of the trigger condition responsive to detecting the use of the one or more trigger words, phrases, or questions in the natural language prompts.

4. The data processing system of claim 1, wherein detecting the occurrence of the trigger condition further comprises:

obtaining a transcript of the online meeting;

analyzing the transcript using the language model to obtain a prediction whether the transcript indicates that the ideation session should be initiated; and detecting the occurrence of the trigger condition responsive to the language model outputting the prediction that the ideation session should be initiated.

5. The data processing system of claim 1, wherein detecting the occurrence of the trigger condition further comprises:

obtaining messages from a meeting chat associated with the online meeting;

analyzing the messages using the language model to obtain a prediction whether the messages indicate that the ideation session should be initiated; and detecting the occurrence of the trigger condition responsive to the language model outputting the prediction that the ideation session should be initiated.

6. The data processing system of claim 1, wherein the memory further includes instructions configured to cause the processor alone or in combination with other processors to perform operations of:

causing the plurality of client devices associated with the participants of the online meeting to present an interactive collaboration tool populated with ideation information on a user interface of the plurality of client devices; and synchronizing changes to the ideation information among the plurality of client devices during the online meeting.

7. The data processing system of claim 1, wherein conducting the ideation session according to the agenda further comprises:

animating an avatar of a virtual meeting assistant based on animation transcript generated by the language model.

8. The data processing system of claim 1, wherein the memory further includes instructions configured to cause the processor alone or in combination with other processors to perform operations of:

receiving feedback from one or more participants of the online meeting about the agenda;

constructing a second prompt for the language model to cause the language model to revise the agenda based on the feedback; and providing the second prompt to the language model to cause the language model to revise the agenda.

9. A method implemented in a data processing system for conducting an online meeting, the method comprising:

detecting an occurrence of a trigger condition during an online meeting among a plurality of client devices associated with participants of the online meeting, the occurrence of the trigger condition indicating that an ideation session for collecting ideas from the participants should be initiated;

selecting an ideation session template from among a plurality of ideation session templates based on meeting information associated with the online meeting, each ideation session template comprising a natural language prompt template that includes instructions to a language model to generate an agenda for a specific type of ideation session and to conduct the ideation session according to the agenda;

constructing a prompt based on the natural language prompt template of the ideation session template that was selected; providing the prompt as an input to the language model to cause the language model to generate the agenda for the ideation session; and automatically conducting the ideation session according to the agenda.

10. The method of claim 9, wherein detecting the occurrence of the trigger condition further comprises:

detecting an indication received from a control of a user interface of a communications application on a client device of a participant of the online meeting indicating that the participant has requested that the ideation session be initiated.

11. The method of claim 9, wherein detecting the occurrence of the trigger condition further comprises:

analyzing natural language prompts using the language model to detect a use of one or more trigger words, phrases, or questions that indicate that the ideation session should be initiated, the natural language prompts being submitted through a user interface of a communication application on a client device of a participant of the online meeting; and receiving an output from the language model indicating the occurrence of the trigger condition responsive to detecting the use of the one or more trigger words, phrases, or questions in the natural language prompts.

12. The method of claim 9, wherein detecting the occurrence of the trigger condition further comprises:

obtaining a transcript of the online meeting;

analyzing the transcript using the language model to obtain a prediction whether the transcript indicates that the ideation session should be initiated; and detecting the occurrence of the trigger condition responsive to the language model outputting the prediction that the ideation session should be initiated.

13. The method of claim 9, wherein detecting the occurrence of the trigger condition further comprises:

obtaining messages from a meeting chat associated with the online meeting;

analyzing the messages using the language model to obtain a prediction whether the messages indicate that the ideation session should be initiated; and detecting the occurrence of the trigger condition responsive to the language model outputting the prediction that the ideation session should be initiated.

14. The method of claim 9, further comprising:

causing the plurality of client devices associated with the participants of the online meeting to present an interactive collaboration tool populated with ideation information on a user interface of the plurality of client devices; and synchronizing changes to the ideation information among the plurality of client devices during the online meeting.

15. The method of claim 9, further comprising:

animating an avatar of a virtual meeting assistant based on animation transcript generated by the language model.

16. The method of claim 9, further comprising:

receiving feedback from one or more participants of the online meeting about the agenda; constructing a second prompt for the language model to cause the language model to revise the agenda based on the feedback; and providing the second prompt to the language model to cause the language model to revise the agenda.

* * * * *